(12) United States Patent
Juni

(10) Patent No.: US 9,494,716 B2
(45) Date of Patent: Nov. 15, 2016

(54) MICROMIRROR ARRAY, MANUFACTURING METHOD FOR MICROMIRROR ARRAY, AND OPTICAL ELEMENTS USED IN MICROMIRROR ARRAY

(71) Applicant: NITTO DENKO CORPORATION, Ibaraki-shi, Osaka (JP)

(72) Inventor: Noriyuki Juni, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 0 days.

(21) Appl. No.: 14/413,323

(22) PCT Filed: Jul. 8, 2013

(86) PCT No.: PCT/JP2013/068581
§ 371 (c)(1),
(2) Date: Jan. 7, 2015

(87) PCT Pub. No.: WO2014/010538
PCT Pub. Date: Jan. 16, 2014

(65) Prior Publication Data
US 2015/0192709 A1    Jul. 9, 2015

(30) Foreign Application Priority Data

Jul. 13, 2012 (JP) .................................. 2012-157827
Jun. 27, 2013 (JP) .................................. 2013-134994

(51) Int. Cl.
G02B 27/10 (2006.01)
G02B 5/08 (2006.01)
(Continued)

(52) U.S. Cl.
CPC ............ G02B 5/08 (2013.01); B29D 11/00596 (2013.01); G02B 5/0816 (2013.01); G02B 5/124 (2013.01); G02B 5/045 (2013.01); G02B 5/09 (2013.01); Y10T 29/49826 (2015.01)

(58) Field of Classification Search
CPC .. G02B 3/005; G02B 3/0056; G02B 3/0062; G02B 3/0068; G02B 5/08; G02B 5/0816

USPC ................................. 359/619–624, 838, 850
See application file for complete search history.

(56) References Cited

U.S. PATENT DOCUMENTS

| | | | |
|---|---|---|---|
| 2001/0002878 A1 | 6/2001 | Sejkora et al. | |
| 2010/0231860 A1 | 9/2010 | Maekawa | |

(Continued)

FOREIGN PATENT DOCUMENTS

| | | |
|---|---|---|
| CN | 101809046 A | 8/2010 |
| CN | 103492916 A | 1/2014 |

(Continued)

OTHER PUBLICATIONS

Notification of Transmittal of Translation of the International Preliminary Report on Patentability (Chapter I or Chapter II) Form PCT/IB/338 of International Application No. PCT/JP2013/068581 mailed Jan. 22, 2015, with forms PCT/IB/373 and PCT/ISA/237. (7 pages).
International Search Report dated Aug. 6, 2013, issued in corresponding application No. PCT/JP2013/068581.

(Continued)

*Primary Examiner* — William Choi
(74) *Attorney, Agent, or Firm* — Westerman, Hattori, Daniels & Adrian, LLP

(57) ABSTRACT

A manufacturing method for a micromirror array includes: preparing transparent flat substrates; attaching each of the substrates at a predetermined position of a machining stage of a dicing machine; sequentially forming parallel linear grooves arranged at intervals in one surface of each substrate; and stacking the substrates together so that the directions in which the linear grooves of the respective substrates extend are orthogonal to each other as seen in plan view. The substrates are stacked together in a manner selected from the group consisting of: the front surface of one of the substrates and the back surface of the other substrate are joined together for the stacking of the substrates; the front surfaces of the respective substrates are joined together for the stacking of the substrates; and the back surfaces of the respective substrates are joined together for the stacking of the substrates.

5 Claims, 15 Drawing Sheets

(51) Int. Cl.
   *G02B 5/124*   (2006.01)
   *B29D 11/00*   (2006.01)
   *G02B 5/09*        (2006.01)
   *G02B 5/04*        (2006.01)

(56) References Cited

U.S. PATENT DOCUMENTS

| | | |
|---|---|---|
| 2010/0259821 A1 | 10/2010 | Kaida et al. |
| 2011/0181949 A1 | 7/2011  | Hashikawa |
| 2012/0300310 A1 | 11/2012 | Maekawa et al. |
| 2014/0042738 A1 | 2/2014  | Power et al. |

FOREIGN PATENT DOCUMENTS

| | | |
|---|---|---|
| JP | 9-218304 A      | 8/1997 |
| JP | 2003-500684 A   | 1/2003 |
| JP | 2009-229905 A   | 10/2009 |
| JP | 2010-256840 A   | 11/2010 |
| JP | 2011-191404 A   | 9/2011 |
| JP | 2012-27172 A    | 2/2012 |
| JP | 2012-247459 A   | 12/2012 |
| WO | 2007/116639 A1  | 10/2007 |
| WO | 2009/136578 A1  | 11/2009 |

OTHER PUBLICATIONS

Chinese Office Action dated Feb. 29, 2016, issued in corresponding CN Application No. 201380036567.8 (15 pages).

| | Example 7 | Example 8 | Example 9 | Example 10 |
|---|---|---|---|---|
| Aspect Ratio (H/W) | 3.10 | 4.09 | 5.06 | 6.14 |
| Luminance (cd/m$^2$) | 0.44 | 0.65 | 0.77 | 0.59 |
| Visual Recognizability (Reference Photographs) |  |  |  |  |

MICROMIRROR ARRAY, MANUFACTURING METHOD FOR MICROMIRROR ARRAY, AND OPTICAL ELEMENTS USED IN MICROMIRROR ARRAY

TECHNICAL FIELD

The present invention relates to a micromirror array which forms a mirror image of an object to be projected in space, a method of manufacturing the same, and optical elements for use in the micromirror array.

BACKGROUND ART

A micromirror array in which multiple "unit optical elements each reflecting light by means of one or more mirror surfaces" are disposed on a substrate (base) constituting an element surface of an optical element has been developed as an image-forming optical element which image-forms a three-dimensional or two-dimensional object, image and the like. In particular, a micromirror array including a large number of recessed unit optical elements or protruding unit optical elements arranged in an array and each having "two mirror surfaces orthogonal to each other" (a corner reflector) disposed at right angles or at an angle close to the right angles to this substrate has received attention in recent years because it is relatively simple in structure and it is expected to reduce manufacturing costs (with reference to Patent Literature 1).

Examples of the aforementioned micromirror array are shown in FIGS. 12 and 13.

In a recessed type micromirror array 50 (hereinafter referred to simply as an "array" in some cases) shown in FIG. 12, a large number of minute holes 51 in the shape of a quadrangular tube (unit optical elements; the ratio of length, width and depth is approximately 1:1:1 in this example) are formed in one surface of a flat substrate 3 (element surface P) made of a transparent material so as to extend to the other surface thereof, and are arranged in a checkerboard pattern angled at 45 degrees with respect to an observer. At least two surfaces out of the four side surfaces (inner wall surfaces) of each of the unit optical elements (minute holes 51) are formed as mirror surfaces (light-reflective wall surfaces).

In a protruding type micromirror array 60 shown in FIG. 13, a large number of transparent minute protruding portions 61 in the shape of a quadrangular prism (unit optical elements; cubes having an approximately 1:1:1 ratio of width, depth and height in this example) are formed on one surface of a substrate 4 (element surface P) made of a transparent material, and are arranged in a checkerboard pattern angled at 45 degrees with respect to an observer. In the case of the aforementioned array 60, at least two surfaces out of the four side surfaces (wall surfaces) of each of the unit optical elements (minute protruding portions 61) are formed as mirror surfaces (light-reflective wall surfaces).

As shown in FIG. 14, when light incident on one surface (front or back) side of a micromirror array L of the aforementioned recessed type, protruding type or the like passes through the array L, this light (dash-double-dot lines) is reflected once from each of the two mirror surfaces on opposite sides of one corner K of each of the unit optical elements (twice in total). The light reflected twice (passing light) forms a mirror image (reversed image M' indicated by a chain line) of an object M to be projected at a spatial position on the other surface side of each aforementioned array L (position symmetrical to the object M with respect to the plane of the element surface P).

An example of a method of producing a recessed type micromirror array as mentioned above which has hitherto been employed includes a method of reversely transferring the shape of the aforementioned unit optical elements by a nano imprint technique or an electroforming technique through the use of a metal mold (molding die) configured such that a large number of minute protruding portions complementary in shape to the recessed unit optical elements, respectively, are previously formed on a flat foundation (Patent Literature 1). An example of a method of producing a protruding type micromirror array which has been proposed includes a method of forming a large number of minute prisms arranged at predetermined spacings on a substrate by injection molding or hot press molding through the use of a metal mold (stamper) having a large number of minute cavities (recessed portions) complementary in shape to the protruding unit optical elements (Patent Literature 2).

CITATION LIST

Patent Literature

PTL 1: International Publication No. WO2007/116639
PTL 2: Japanese Published Patent Application No. 2011-191404

SUMMARY OF INVENTION

Unfortunately, the methods of manufacturing the micromirror arrays using the aforementioned molding die and the stamper involve the need for a mold release (mold removal) step after the molding. The presence of such a mold release step not only makes the manufacturing procedure complicated but also is prone to cause a problem such that a sharp image cannot be obtained because the finished unit optical elements adhere to the aforementioned molding die and the like and partly come off or become chipped during the mold release to result in defects caused in the arrays. Thus, a configuration of a micromirror array as an alternative to these and a new manufacturing method which does not use the molding die have been sought.

In view of the foregoing, it is therefore an object of the present invention to provide a micromirror array capable of forming a bright high-luminance image, optical elements for use in the micromirror array, and a method of manufacturing a micromirror array which is capable of manufacturing an array at low costs without a mold release or mold removal process.

To accomplish the aforementioned object, a first aspect of the present invention is intended for a micromirror array for forming a mirror image of an object to be projected which is disposed on a first surface side of a flat optical element at a spatial position on a second surface side thereof symmetrical to the object with respect to the plane of an element surface of this optical element, the micromirror array being characterized in that two optical elements each having a plurality of parallel linear grooves arranged at predetermined spacings and formed in a first surface of a transparent flat substrate by dicing using a rotary blade are stacked together so that the directions in which the linear grooves of the respective optical elements extend are orthogonal to each other as seen in plan view, to thereby constitute a single unit, the two optical elements being stacked together in a manner selected from the group consisting of: (A) a manner in which the front surface of one of the optical elements where the linear grooves are formed and the back surface of the other optical element where the grooves are not formed are brought into abutment with each other; (B) a manner in which the front surfaces of the respective optical elements where the linear grooves are formed are brought into abutment with each other; and (C) a manner in which the back surfaces of the respective optical elements where the grooves are not formed are brought into abutment with each other.

A second aspect of the present invention is intended for a micromirror array for forming a mirror image of an object to be projected which is disposed on a first surface side of a flat optical element at a spatial position on a second surface side thereof symmetrical to the object with respect to the plane of an element surface of this optical element, the micromirror array being characterized in that a plurality of parallel linear grooves arranged at predetermined spacings are formed in a first surface of a transparent flat substrate constituting said optical element and in a second surface thereof opposite from the first surface by dicing using a rotary blade so that the directions in which the linear grooves on the front surface side and the linear grooves on the back surface side extend are orthogonal to each other as seen in plan view.

To accomplish the same object, a third aspect of the present invention is intended for a method of manufacturing a micromirror array as recited in the first aspect, the method comprising the steps of: preparing a transparent flat substrate; attaching the substrate at a predetermined position of a machining stage of a dicing machine; sequentially forming parallel linear grooves arranged at predetermined intervals in a surface of said substrate by using a rotary blade; and stacking two substrates where said linear grooves are formed together so that the directions in which the linear grooves of the respective substrates extend are orthogonal to each other as seen in plan view, to thereby constitute a single unit, the two substrates being stacked together in a manner selected from the group consisting of: (D) a manner in which the front surface of one of the substrates where the linear grooves are formed and the back surface of the other substrate where the grooves are not formed are joined together for the stacking of the substrates; (E) a manner in which the front surfaces of the respective substrates where the linear grooves are formed are joined together for the stacking of the substrates; and (F) a manner in which the back surfaces of the respective substrates where the grooves are not formed are joined together for the stacking of the substrates.

Further, a fourth aspect of the present invention is intended for a method of manufacturing a micromirror array as recited in the second aspect, the method comprising the steps of: preparing a transparent flat substrate; attaching the substrate at a predetermined position of a machining stage of a dicing machine; sequentially forming parallel linear grooves arranged at predetermined intervals in a first surface of said substrate by using a rotary blade; removing the substrate once from said machining stage to flip the substrate upside down and to thereafter attaching the substrate again at a predetermined position of the machining stage; and sequentially forming parallel linear grooves similar to those in said first surface and arranged at predetermined intervals in a second surface of said substrate by using a rotary blade so as to extend in a direction orthogonal to the linear grooves in said first surface as seen in plan view.

Also, a fifth aspect of the present invention is intended for an optical element for a micromirror array, wherein a plurality of parallel linear grooves arranged at predetermined spacings are formed in a surface of a transparent flat substrate. A sixth aspect of the present invention is intended for a micromirror array including two such optical elements stacked one on top of the other.

The present inventor has broken the bounds of common technical practice such that a molding method using the aforementioned conventional metal mold, stamper and the like is used as a machining method for enhancing the efficiency of the manufacture of the micromirror array, and has considered and carried out the use of dicing which achieves precise groove engraving. As a result, the present inventor has succeeded in obtaining a micromirror array capable of forming a bright sharp image at lower costs and in higher yields than conventional manufacturing methods.

In the micromirror array according to the first aspect of the present invention as described above, the linear grooves in the substrate are formed by dicing using the rotary blade. For this reason, the wall surfaces (side surfaces) on opposite sides constituting each of the grooves are in the form of light-reflective vertical surfaces (mirror surfaces, i.e. first mirror surfaces constituting corner reflectors to be described later). The plurality of linear grooves are parallel to each other and are disposed at predetermined spacings in one substrate. One substrate which is rotated 90 degrees horizontally is stacked on top of the other substrate in any one of the aforementioned manners (A) to (C), to thereby constitute a single unit. With this configuration, a group of linear grooves on one substrate side and a group of linear grooves on the other substrate side are orthogonal to each other in the form of a lattice, as seen in plan view in the direction of the front and back of the substrates (vertical direction). A multiplicity of "corner reflectors" each comprised of two vertically spaced mirror surfaces are formed at the intersections of these groups of grooves. These corner reflectors cause light incident on one surface side of the aforementioned substrate (optical element) to be reflected once from each of the two mirror surfaces constituting each corner reflector, and then cause the reflected light to be transmitted through the substrate to the other side thereof. Thus, the micromirror array according to the first aspect of the present invention is capable of brightly and sharply forming a mirror image of an object to be projected which is disposed on one surface side of the aforementioned substrate at a spatial position on the other surface side symmetrical to the object with respect to the plane of the substrate.

In the micromirror array according to the second aspect of the present invention, a group of linear grooves formed in the first surface (front surface) of one substrate and a group of linear grooves formed in the second surface (back surface) thereof opposite from the first surface are orthogonal to each other in the form of a lattice, as seen in plan view in the direction of the front and back of the substrate (vertical direction). A multiplicity of "corner reflectors" each comprised of two vertically spaced mirror surfaces as in the micromirror array of the aforementioned first aspect are formed at the intersections of these groups of grooves. Also in this micromirror array, light incident on one surface side of the aforementioned substrate (optical element) is reflected once from each of the two mirror surfaces constituting each corner reflector, and then the reflected light is transmitted through the substrate to the other side thereof. Thus, the micromirror array according to the second aspect of the present invention is capable of brightly and sharply forming a mirror image of an object to be projected which is disposed on one surface side of the aforementioned substrate at a spatial position on the other surface side symmetrical to the object with respect to the plane of the substrate.

Next, the manufacturing method for a micromirror array according to the third aspect of the present invention includes the step of stacking these substrates together in any one of the aforementioned manners (D) to (F) to thereby constitute a single unit after forming the linear grooves in each substrate which constitute the aforementioned corner reflectors by dicing using the rotary blade. Thus, the aforementioned manufacturing method for a micromirror array is capable of accurately and efficiently forming the optical elements having the aforementioned linear grooves and the micromirror array, and is capable of manufacturing the micromirror array easily at low costs as compared with conventional manufacturing methods. Further, the aforementioned manufacturing method for a micromirror array does not include any step which is prone to damage the array, such as mold release (mold removal). This improves the yield in the manufacture of the array and the optical elements constituting the array. Moreover, the groove formation using the aforementioned dicing makes it relatively easy to adjust the optical performance of the optical elements, such as the increase in the aspect ratio [the ratio of height (length in the thickness direction of the substrates) H to width (width in the horizontal direction of the substrates) W] of the light reflecting surfaces (mirror surfaces) by changing the intervals (spacings) between the grooves and the depth of the grooves. This is advantageous in that the flexibility of array design is improved.

In the manufacturing method for a micromirror array according to the fourth aspect of the present invention, the linear grooves on the first surface (front surface) side of the substrate and the linear grooves on the second surface (back surface) side thereof opposite from the first surface side which constitute the aforementioned corner reflectors are also formed by dicing using the rotary blade. For this reason, the method is capable of accurately and efficiently forming the linear grooves. Like the manufacturing method for a micromirror array according to the third aspect, the manufacturing method for a micromirror array according to the fourth aspect is thus capable of manufacturing the micromirror array easily at low costs as compared with conventional manufacturing methods. Further, the aforementioned manufacturing method for a micromirror array according to the fourth aspect does not include any step which is prone to damage the array, such as mold release (mold removal). This improves the yield in the manufacture of the array and the optical element constituting the array. Similarly, this method is capable of relatively easily adjusting the optical performance of the optical element, such as changing the intervals (spacings) between the grooves and the depth thereof.

In the optical element (optical element unit) for use in the aforementioned micromirror array, the plurality of parallel linear grooves arranged at predetermined spacings are formed in one surface of the transparent flat substrate. In particular, the optical element wherein the ratio "height H/width W" between the width (W) of the substrate front surface portions lying between adjacent ones of the linear grooves and the height (H) of the substrate front surface portions from the bottom of the grooves (the aforementioned aspect ratio) is not less than 3.0 is preferably used. Also, the micromirror array including two optical elements as described above stacked one on top of the other is capable of more brightly and more sharply forming the mirror image of the object to be projected at the spatial position on the second surface side thereof symmetrical to the object with respect to the plane of the substrate.

DESCRIPTION OF EMBODIMENTS

Next, embodiments according to the present invention will now be described in detail with reference to the drawings.

Figure 1:
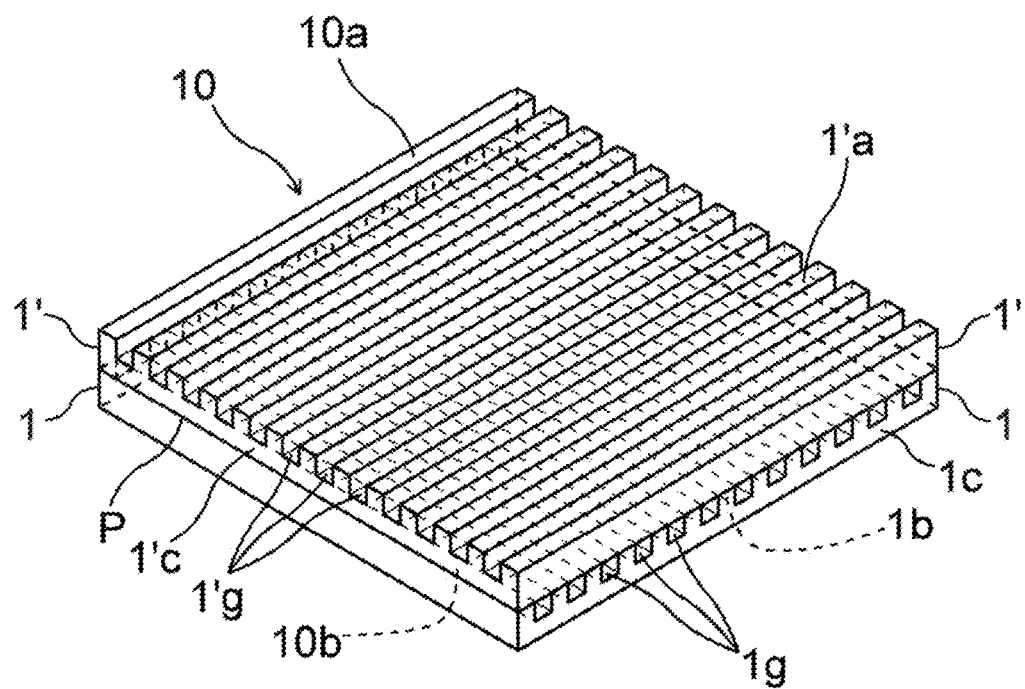
FIG. 1 is a perspective view showing a structure of a micromirror array according to a first embodiment of the present invention.
Figure 2:
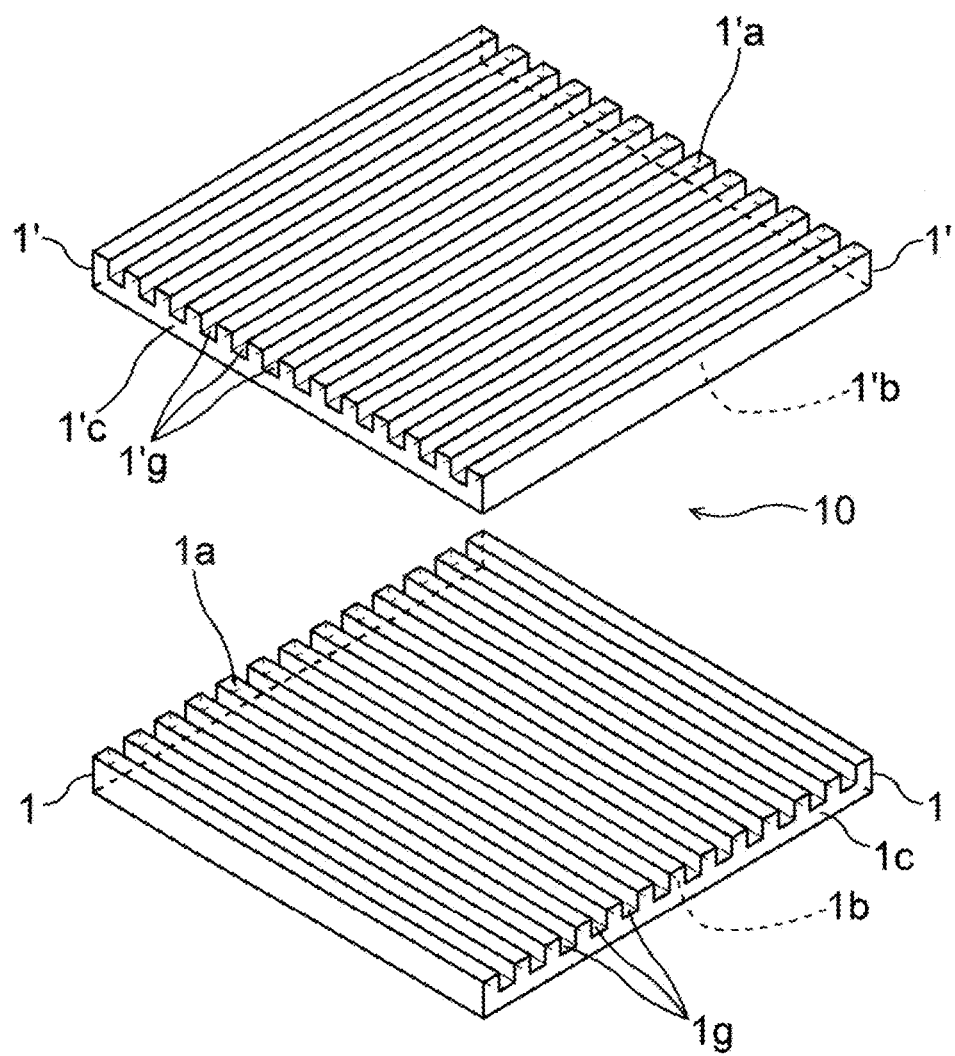
FIG. 2 is an exploded perspective view of the micromirror array according to the first embodiment of the present invention.

FIG. 1 is a perspective view showing a structure of a micromirror array according to a first embodiment of the present invention. FIG. 2 is an exploded perspective view of this micromirror array. Linear grooves 1g and 1'g provided in substrates 1 and 1' are drawn on an enlarged scale for easier understanding of the structure thereof (the same applies to the subsequent figures). In the following description, a surface in which the grooves 1g and 1'g are formed is referred to as a "front surface" side 1a and 1'a, a surface in which the grooves 1g and 1'g are not formed is referred to as a "back surface" side 1b and 1'b, and a flat area of each substrate to which the engraving of the grooves 1g and 1'g does not extend is referred to as a plate-like portion 1c and 1'c.

The micromirror array 10 according to the first embodiment of the present invention shown in FIG. 1 is formed as an "image-forming optical element" for forming a mirror image of an object to be projected which is disposed on one surface side (front surface 10a side or back surface 10b side) of the array 10 at a spatial position on the other surface side (back surface 10b side or front surface 10a side) symmetrical to the object with respect to the plane of an element surface P of this array 10. As shown in FIG. 2, the optical elements (substrates 1 and 1') constituting this micromirror array 10 are configured such that a plurality of parallel linear grooves 1g and grooves 1'g spaced at predetermined intervals are formed in the upper front surfaces 1a and 1'a of the transparent flat substrates 1 and 1', respectively, by dicing using a rotary blade J to be described later. The aforementioned micromirror array 10 is formed using the two optical elements (substrates 1 and 1') identical with each other in shape. With the first upper substrate 1' rotated relative to the second lower substrate 1 so that the continuous directions in which the grooves 1g and the grooves 1'g provided in the substrates 1 and 1' extend are orthogonal to each other as seen in plan view, the back surface 1'b (plate-like portion 1'c) where the grooves 1'g are not formed in the upper substrate 1' is brought into abutment with the front surface 1a where the grooves 1g are formed in the lower substrate 1. These substrates 1 and 1' are stacked one on top of the other to constitute the single array. This is a characteristic of the micromirror array 10 according to the first embodiment of the present invention.

The configuration of the aforementioned micromirror array 10 will be described in further detail. The substrates 1 and 1' (substrates prior to the formation of the grooves 1g and 1'g) constituting the respective optical elements are base bodies for engraving of the aforementioned grooves 1g and 1'g, and are made of a material having a visible light transmittance of not less than 80%, such as glass and acrylic resin, for example. These substrates 1 and 1' are generally in the form of hard plates having a fixed thickness (thickness on the order of 0.5 to 10.0 mm). The upper surfaces (front surfaces 1a and 1' a) of the substrates 1 and 1' are engraved with the aforementioned linear grooves 1g and 1'g by dicing. Substrate surface portions which lie between adjacent ones of the aforementioned linear grooves 1g and which are not engraved with the grooves are protruding portions (ridge portions or ridge areas) protruding toward one surface of the substrate 1 by the formation of the adjacent grooves. The flat areas (plate-like portions 1c and 1'c) to which the engraving of the grooves 1g and 1'g does not extend are support bases for the aforementioned ridge portions formed unengraved between the grooves 1g and 1'g.

The grooves 1g and 1'g in the aforementioned substrates 1 and 1' are formed using a rotary blade (with reference to the dicing blade J in FIG. 9 and the like) of a dicing machine, and are spaced at predetermined intervals (spacings) in one direction in surfaces to be machined (front surfaces) of the substrates 1 and 1' so as to be parallel to each other. It should be noted that the side surfaces (wall surfaces) constituting these grooves 1g and 1'g, which are formed by dicing using the aforementioned rotary blade, are formed as light-reflective vertical surfaces (mirror surfaces). The term "vertical surfaces" as used in the present invention shall be meant to include not only surfaces exactly perpendicular to the substrate bottom surface (or groove bottom surface) but also surfaces the standing angle of which with respect to the substrate bottom surface is slightly (for example, about 2 degrees or less) deviated, and may be substantially the same in light-reflective properties.

Depending on the thickness of the aforementioned blade J (total thickness between end surfaces), the grooves 1g and 1'g obtained by engraving using the dicing blade J have a groove width G of approximately 20 to 350 μm and a groove depth H of approximately 50 to 500 μm, when the blade J having a thickness of the order of 0.015 mm (15 μm) to 0.3 mm (300 μm) is in general used. The remaining regions (ridge portions) where these grooves 1g and 1'g are not formed are in the form of parallel ribs having a width W of approximately 50 to 300 μm and a height H of approximately 50 to 500 μm (the same as the depth of the grooves).

With the first upper substrate 1' rotated 90 degrees horizontally relative to the second lower substrate 1 (that is, with a phase difference of 90 degrees between the lower substrate 1 and the upper substrate 1') as shown in FIG. 2, the back surface 1'b of the upper substrate 1' (the lower surface of the plate-like portion 1'c) is brought into abutment with the front surface 1a (upper surface) of the lower substrate 1. The two substrates 1 and 1' in which the aforementioned respective linear grooves 1g and 1'g are formed are stacked together to constitute the single (integral) micromirror array 10 as shown in FIG. 1 [aforementioned manner (A)]. At this time, there is a phase difference of 90 degrees between the lower substrate 1 and the upper substrate 1' as mentioned above. Thus, the directions (continuous directions) in which the grooves 1g and 1'g of the respective substrates 1 and 1' formed in the same shape extend are disposed in orthogonal relation to each other as seen in plan view [three-dimensionally in "skew" relation; with reference to FIG. 8B].

Figure 8A:
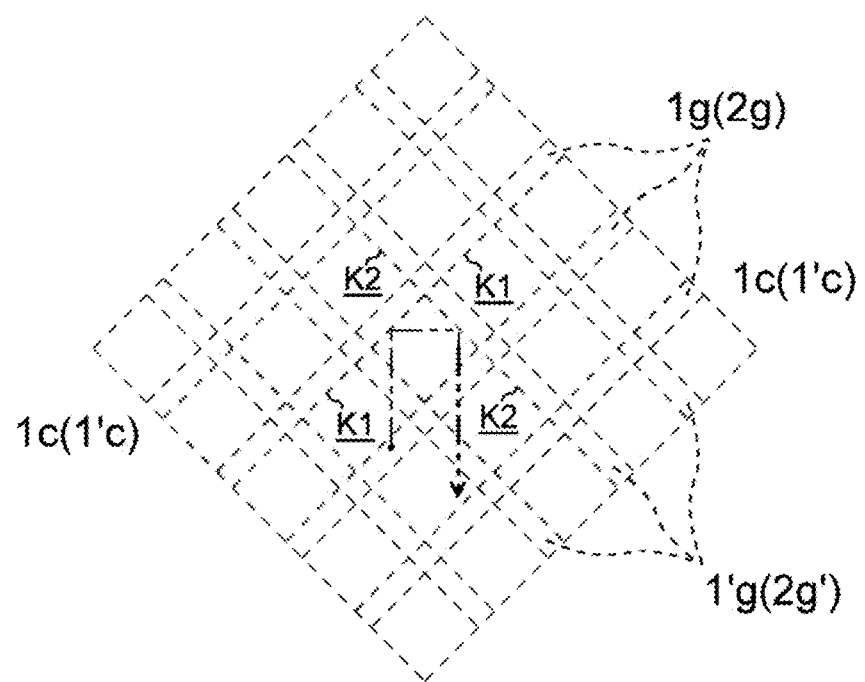
FIG. 8A is a plan view of corner reflector portions inside the micromirror array according to the present invention as seen in a vertical direction.
Figure 8B:
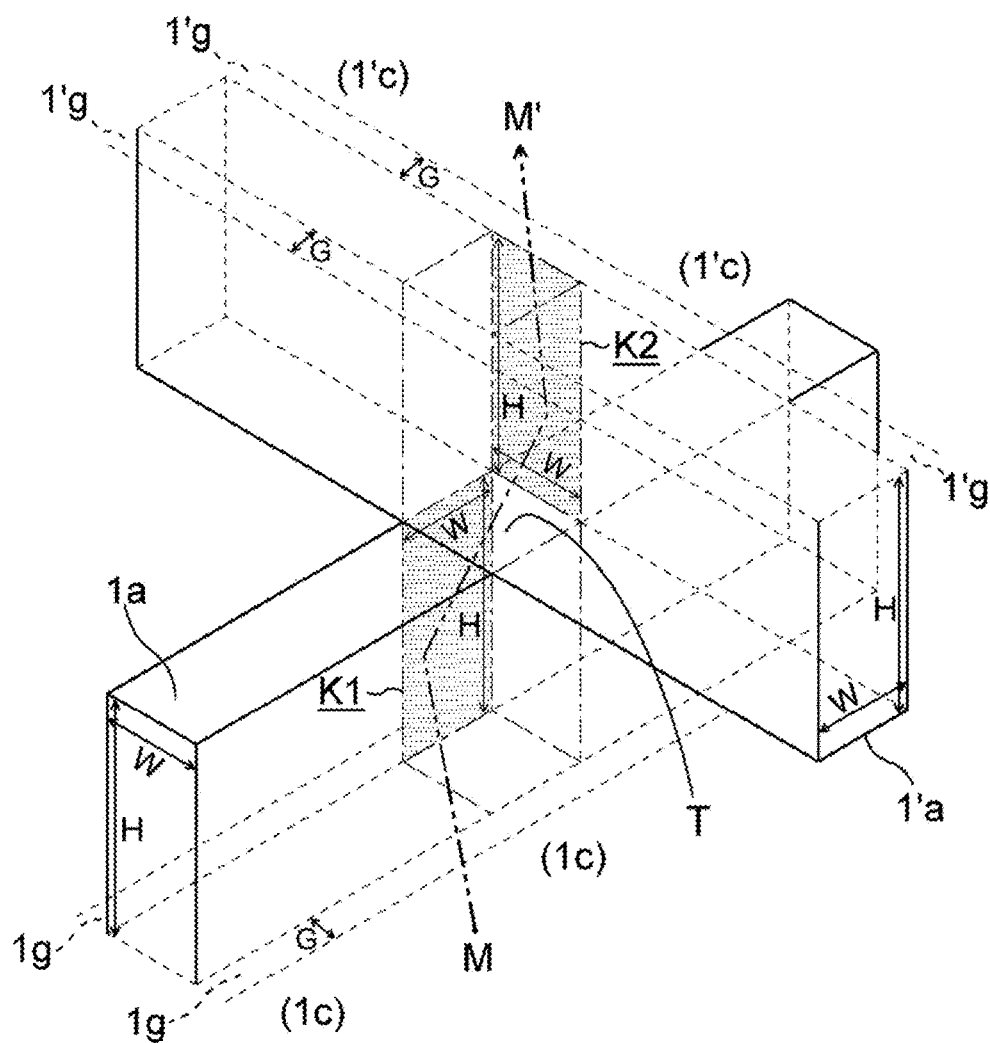
FIG. 8B is a schematic view showing a three-dimensional structure of one corner reflector (a pair of mirror surfaces of one corner reflector) thereof.

When the aforementioned micromirror array 10 is seen in the direction of the front and back of the substrates (vertical direction) in this state [with reference to FIG. 8A], the grooves 1'g of the upper substrate 1' and the grooves 1g of the lower substrate 1 are orthogonal to each other in the form of a lattice as seen in plan view. A corner reflector [a pair of vertically spaced surfaces of a corner reflector; FIG. 8B] is formed at the intersection of each of the grooves 1'g and each of the grooves 1g. Such a corner reflector includes a light-reflective vertical surface (mirror surface K2) of each of the grooves 1'g of the upper substrate 1', and a light-reflective vertical surface (mirror surface K1) of each of the grooves 1g of the lower substrate 1.

Figure 14:
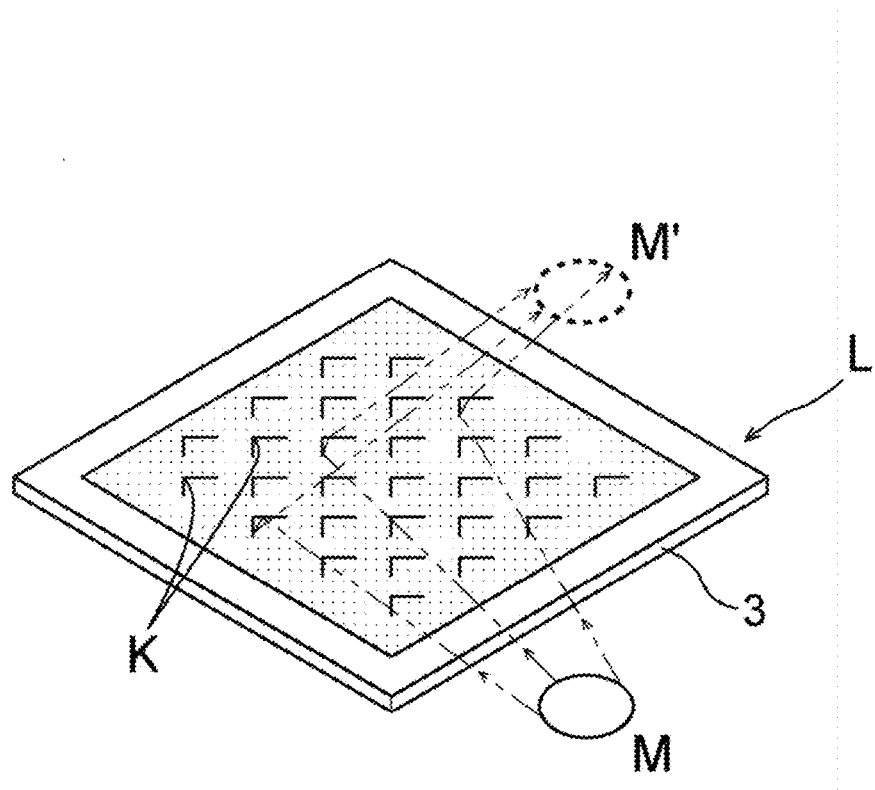
FIG. 14 is a schematic view illustrating a manner of image formation of a mirror image by means of a micromirror array.

Because of the aforementioned configuration of the aforementioned micromirror array 10, light incident on one surface side of the aforementioned array 10 is reflected once from the light-reflective vertical surface (mirror surface) of each of the grooves 1'g of the upper substrate 1', and is reflected once from the light-reflective vertical surface (mirror surface) of each of the grooves 1g of the upper substrate 1. Then, the reflected light is transmitted through the array 10 to the other side thereof. Thus, the micromirror array 10 according to the present first embodiment is capable of forming a mirror image of an object to be projected which is disposed on one surface side of the array 10 at a spatial position on the other surface side symmetrical to the object with respect to the plane of the array 10, as shown in FIG. 14.

The light-reflective vertical surfaces (vertically spaced mirror surfaces K1 and K2) constituting the corner reflectors formed when the substrates 1 and 1' are stacked together have an apparent virtual aspect ratio [the ratio of height H (length in the thickness direction of the substrates) to width W (width of ridge portions in the horizontal direction of the substrates)=H/W; with reference to FIG. 8B] greater than that of conventional products. Therefore, these mirror surfaces reflect more light to project a bright and sharp mirror image ("FIG. 8" and the "virtual aspect ratio" will be described in detail later).

It should be noted that the optical elements (optical element units) constituting the aforementioned micromirror array may be produced by methods other than dicing using the rotary blade as mentioned earlier. It is however desirable that dicing using the rotary blade is used for the efficient production of optical elements having a high aspect ratio (height H/width W of not less than 3.0).

It is also preferable that the two, upper and lower, optical elements constituting the aforementioned micromirror array are identical in specification and are stacked together in front-to-back or back-to-front relation when in use. However, when the decrease in light reflection efficiency is not taken into consideration, optical elements which are different in specification (different in shape), e.g. different in groove width, in spacings and in ridge portion height, may be stacked together when in use.

Next, a second embodiment of the present invention will be described.

Figure 3:
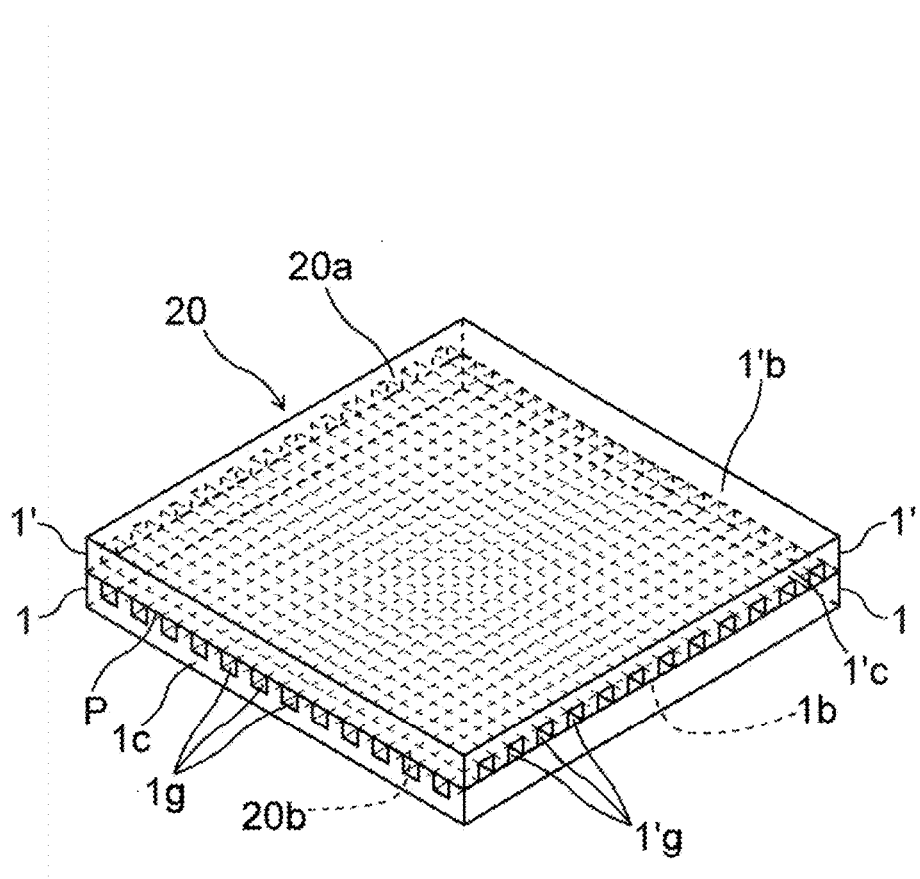
FIG. 3 is a perspective view showing a structure of a micromirror array according to a second embodiment of the present invention.
Figure 4:
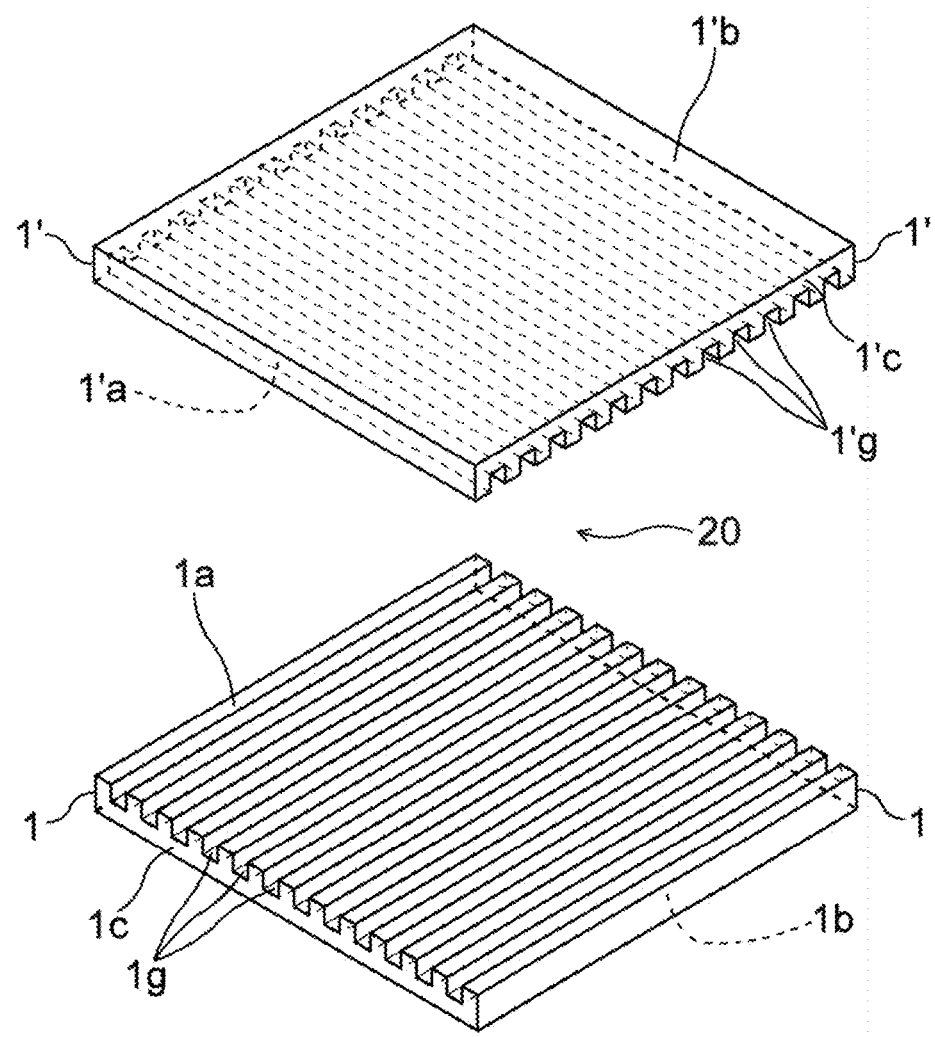
FIG. 4 is an exploded perspective view of the micromirror array according to the second embodiment of the present invention.

FIG. 3 is a perspective view showing a structure of a micromirror array according to the second embodiment of the present invention. FIG. 4 is an exploded perspective view of this micromirror array.

The micromirror array 20 according to the second embodiment of the present invention shown in FIG. 3 is also formed as an "image-forming optical element" for forming a mirror image of an object to be projected which is disposed on one surface side (front surface 20a side or back surface 20b side) of the array 20 at a spatial position on the other surface side (back surface 20b side or front surface 20a side) symmetrical to the object with respect to the plane of the element surface P of this array 20. As in the aforementioned first embodiment, the optical elements constituting this micromirror array 20 are also configured such that the plurality of parallel linear grooves 1g and grooves 1'g spaced at predetermined intervals are formed in the front surfaces 1a and 1'a of the transparent flat substrates 1 and 1', respectively, by dicing using the rotary blade J to be described later. The structure of the optical elements (substrates 1 and 1'), which is similar to that of the substrates 1 and 1' used in the first embodiment, will not be described in detail.

The micromirror array 20 according to the second embodiment differs from the micromirror array 10 according to the first embodiment in that the first upper substrate 1' is flipped upside down so that the front surface 1' a in which the grooves 1'g are formed is positioned to face downward when in use, as shown in FIG. 4. Specifically, the aforementioned micromirror array 20 is formed using the two optical elements (substrates 1 and 1') identical with each other in shape. With the first upper substrate 1' flipped upside down and rotated 90 degrees relative to the second lower substrate 1, the front surface 1'a where the grooves 1'g are formed in the upper substrate 1' is brought into abutment with the front surface 1a where the grooves 1g are formed in the lower substrate 1, as shown in FIG. 4. These substrates 1 and 1' are stacked one on top of the other so that the directions in which the grooves 1g and the grooves 1'g provided in the substrates 1 and 1' extend are orthogonal to each other as seen in plan view, to constitute the single array 20, as shown in FIG. 3 [aforementioned manner (B)]. This is a characteristic of the micromirror array 20 according to the second embodiment of the present invention.

According to the aforementioned configuration, there is a phase difference of 90 degrees between the lower substrate 1 and the upper substrate 1'. Thus, as shown in FIG. 3, the directions in which the grooves 1g and 1'g of the respective substrates 1 and 1' formed in the same shape extend are disposed in orthogonal relation to each other as seen in plan view [three-dimensionally in "skew" relation; FIG. 8B]. Thus, when the aforementioned micromirror array 20 is seen in the direction of the front and back of the substrates (vertical direction), the grooves 1'g of the upper substrate 1' and the grooves 1g of the lower substrate 1 are orthogonal to each other in the form of a lattice as seen in plan view. A corner reflector is formed at the intersection of each of the grooves 1'g and each of the grooves 1g. Such a corner reflector includes a light-reflective vertical surface (mirror surface) of each of the grooves 1'g of the upper substrate 1', and a light-reflective vertical surface (mirror surface) of each of the grooves 1g of the lower substrate 1 [FIG. 8A].

In the micromirror array 20 according to the second embodiment, light incident on one surface side of the aforementioned array 20 is hence reflected once from the light-reflective vertical surface (mirror surface) of each of the grooves 1'g of the upper substrate 1', and is reflected once from the light-reflective vertical surface (mirror surface) of each of the grooves 1g of the upper substrate 1. Then, the reflected light is transmitted through the array 20 to the other side thereof. Thus, the micromirror array 20 according to the present second embodiment is also capable of forming a mirror image of an object to be projected which is disposed on one surface side of the array 20 at a spatial position on the other surface side symmetrical to the object with respect to the plane of the array 20, as shown in FIG. 14. Also, the light-reflective vertical surfaces (mirror surfaces) constituting the aforementioned corner reflectors have a great aspect ratio [apparent virtual aspect ratio; H/W; FIG. 8B]. Therefore, as in the aforementioned first embodiment, these light-reflective vertical surfaces (mirror surfaces) are capable of projecting a bright and sharp mirror image, as compared with conventional products.

Figure 5:
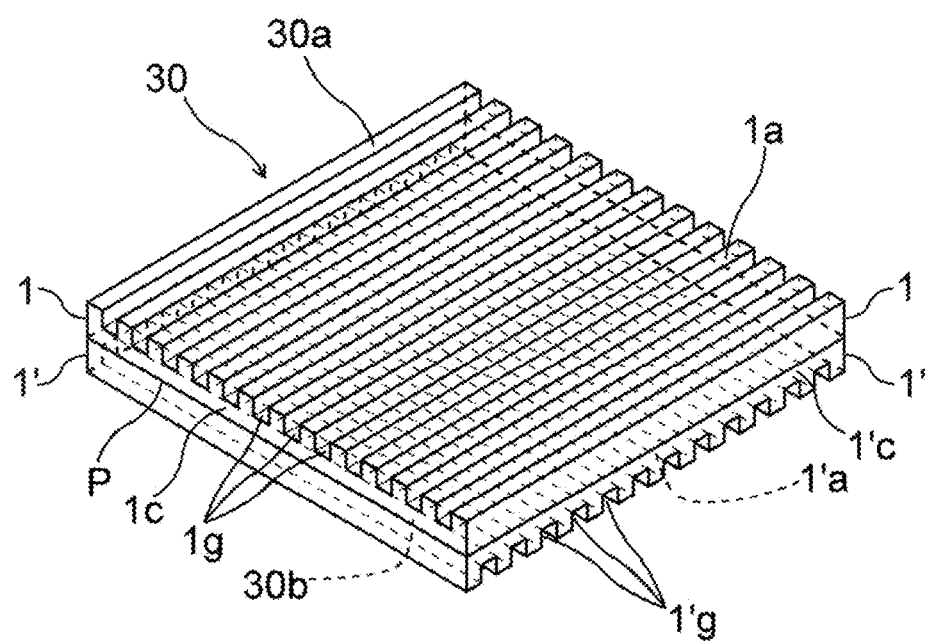
FIG. 5 is a perspective view showing a structure of a micromirror array according to a third embodiment of the present invention.
Figure 6:
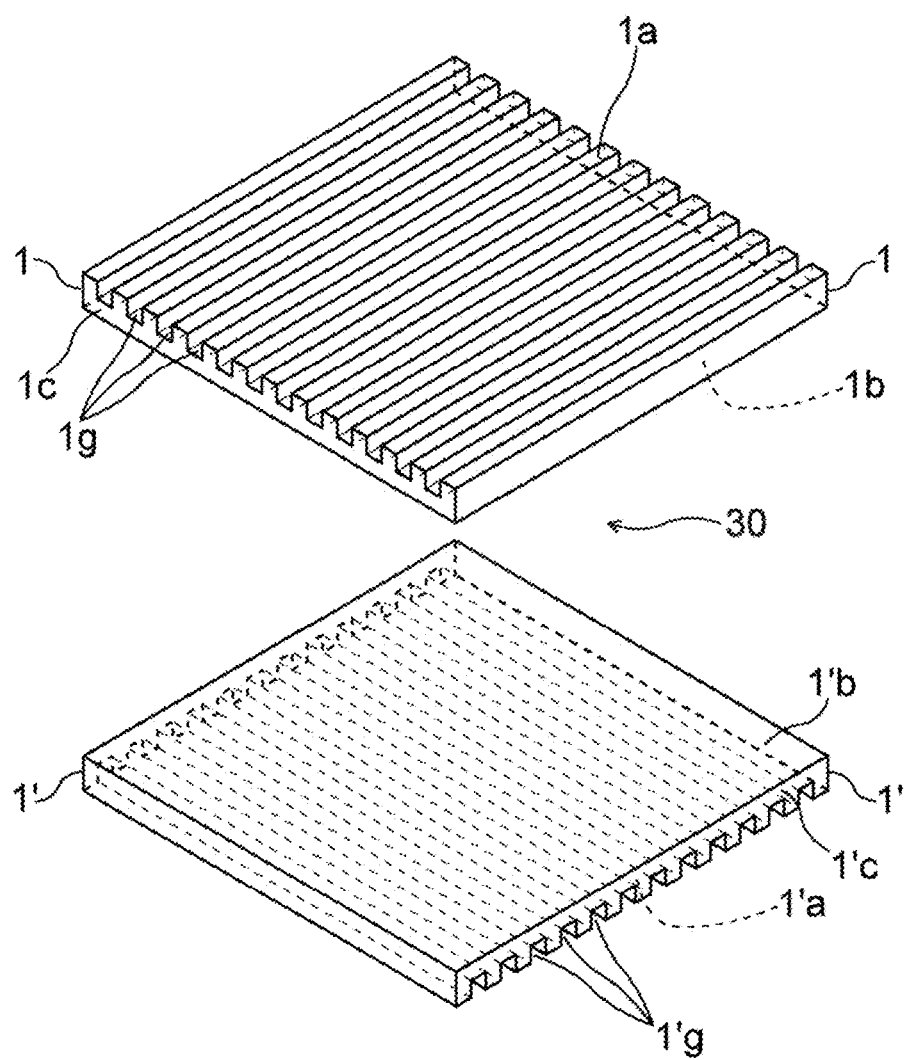
FIG. 6 is an exploded perspective view of the micromirror array according to the third embodiment of the present invention.

In the micromirror array 20 according to the aforementioned second embodiment, the optical elements (substrates 1 and 1') may be stacked one on top of the other, with the positions of the optical elements exchanged (in reverse order). FIG. 5 is a perspective view showing a structure of a micromirror array 30 formed in such a manner according to a third embodiment. FIG. 6 is an exploded perspective view of the aforementioned micromirror array 30.

As shown in FIGS. 5 and 6, the micromirror array 30 according to the third embodiment is formed using the two optical elements identical with each other in shape. With the first lower substrate 1' flipped upside down and rotated 90 degrees relative to the second upper substrate 1, the back surface 1b of the upper substrate 1 (the lower surface of the plate-like portion 1c) is brought into abutment with the back surface 1'b of the lower substrate 1' (the upper surface of the plate-like portion 1'c). These substrates 1 and 1' are stacked one on top of the other so that the directions in which the grooves 1g and the grooves 1'g provided in the substrates 1 and 1' extend are orthogonal to each other as seen in plan view, to constitute the single array 30 [aforementioned manner (C)].

According to the configuration of the micromirror array 30 according to the aforementioned third embodiment, the grooves 1g and 1'g of the substrates 1 and 1' are arranged so that the directions in which the grooves extend are orthogonal to each other in the form of a lattice as seen in plan view. A corner reflector [FIG. 8A] is formed at the intersection of each of the grooves 1'g and each of the grooves 1g. Such a corner reflector includes a light-reflective vertical surface (mirror surface) of each of the grooves 1g of the upper substrate 1, and a light-reflective vertical surface (mirror surface) of each of the grooves 1'g of the lower substrate 1'. This produces effects similar to those of the aforementioned micromirror array 20. The third embodiment is similar to the aforementioned first and second embodiments in being capable of increasing the aspect ratio [apparent virtual aspect ratio; H/W; FIG. 8B] of the light-reflective vertical surfaces (mirror surfaces) of the aforementioned corner reflectors.

Next, a fourth embodiment according to the present invention will be described.

Figure 7:
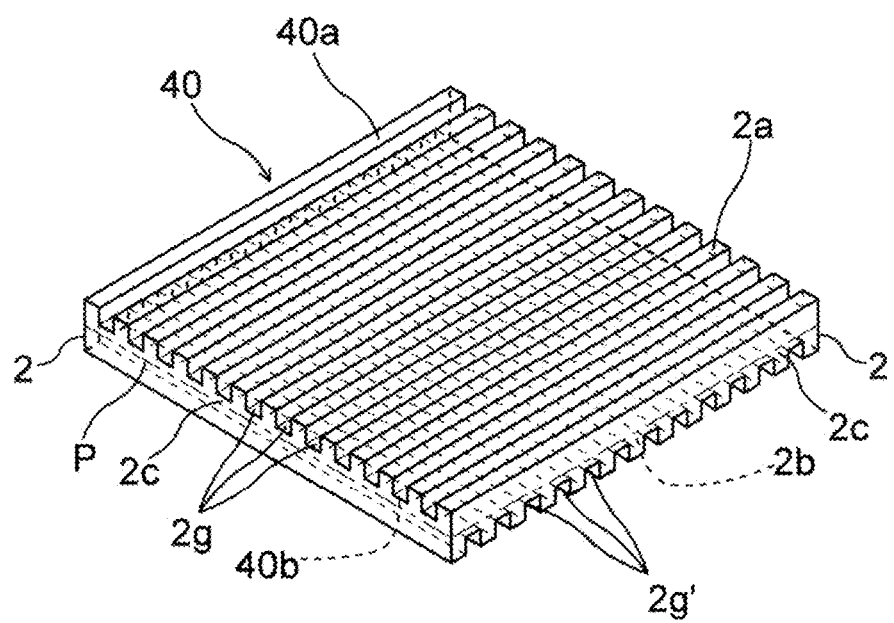
FIG. 7 is a perspective view showing a structure of a micromirror array according to a fourth embodiment of the present invention.

FIG. 7 is a perspective view showing a structure of a micromirror array according to a fourth embodiment of the present invention.

The micromirror array 40 according to the fourth embodiment of the present invention shown in FIG. 7 is also formed as an "image-forming optical element" for forming a mirror image of an object to be projected which is disposed on one surface side (front surface 40a side or back surface 40b side) of the array 40 at a spatial position on the other surface side (back surface 40b side or front surface 40a side) symmetrical to the object with respect to the plane of the element surface P of this array 40. While the micromirror arrays 10 to 30 of the aforementioned first to third embodiments are formed using the two substrates 1 and 1' each provided with the linear grooves 1g and 1'g formed in one surface thereof, the micromirror array 40 according to the fourth embodiment is formed using a single substrate 2 (optical element).

Specifically, as shown in FIG. 7, the aforementioned micromirror array 40 (optical element) is configured such that a plurality of parallel linear grooves 2g and grooves 2g' spaced at predetermined intervals are formed in an upper front surface 2a and a lower back surface 2b, respectively, of the transparent flat substrate 2 by dicing using the rotary blade J to be described later. The grooves 2g on the front surface 2a side and the grooves 2g' on the back surface 2b side are arranged so that the directions (continuous directions) in which the grooves extend are orthogonal to each other as seen in plan view. This is a characteristic of the micromirror array 40 according to the fourth embodiment of the present invention.

Like the aforementioned substrate 1, the substrate (substrate prior to the formation of the grooves 2g and 2g') constituting the aforementioned micromirror array 40 (optical element) is a base body for engraving of the linear grooves 2g and 2'g, and is made of a material (optical element material) having a visible light transmittance of not less than 80%, such as glass and acrylic resin, for example. This substrate 2 is generally in the form of a hard plate having a fixed thickness (thickness on the order of 0.5 to 10.0 mm). The upper and lower surfaces (front and back surfaces 2a and 2b) of the substrate 2 are engraved with the aforementioned linear grooves 2g and 2g' by dicing. A flat area (plate-like portion 2c) to which the engraving of the grooves 2g and 2g' does not extend is a support base for a ridge area formed unengraved between the grooves 2g and 2g'.

The grooves 2g and 2g' of the substrate 2 are formed using a rotary blade (with reference to the dicing blade J in FIG. 9) of a dicing machine, and are spaced at predetermined intervals (spacings) in one direction in surfaces to be machined (front surface 2a and back surface 2b) of the substrate 2 so as to be parallel to each other. Such machining on opposite sides is performed in a manner to be described below. After the grooves 2g are formed in one surface (for example, the front surface 2a), the aforementioned substrate 2 is removed once from the dicing machine. While being flipped upside down, the substrate 2 is attached to the dicing machine. Then, the parallel linear grooves 2g' similar to those in the aforementioned one surface (front surface 2a) are formed in the other surface (back surface 2b) of the substrate 2, with a phase difference of 90 degrees from the aforementioned one surface (front surface 2a) side (in a direction orthogonal to the grooves 2g on the front surface 2a side as seen in plan view).

It should be noted that the side surfaces (wall surfaces) constituting the grooves 2g and 2g', which are formed by dicing using the aforementioned rotary blade, are light-reflective vertical surfaces (mirror surfaces), as in the aforementioned first to third embodiments. Depending on the thickness of the aforementioned blade J (total thickness between end surfaces), the grooves 2g and 2g' obtained by engraving using the dicing blade J have a groove width G of approximately 20 to 350 μm and a groove depth H of approximately 50 to 500 μm, when the blade J having a thickness of the order of 0.015 mm (15 μm) to 0.3 mm (300 μm) is in general used. The remaining regions (ridge areas) where these grooves 2g and 2g' are not formed are in the form of parallel ribs having a width W of approximately 50 to 300 μm and a height H of approximately 50 to 500 μm (the same as the depth of the grooves).

When the aforementioned micromirror array 40 having the aforementioned configuration is seen in the direction of the front and back of the substrate (vertical direction), the grooves 2g on the upper side (front surface 40a side) and the grooves 2g' on the lower side (back surface 40b side) are orthogonal to each other in the form of a lattice as seen in plan view. A corner reflector [FIG. 8A] is formed at the intersection of each of the grooves 2g and each of the grooves 2g'. Such a corner reflector includes a light-reflective vertical surface (mirror surface) of each of the grooves 2g on the front surface 40a side, and a light-reflective vertical surface (mirror surface) of each of the grooves 2g' on the back surface 40b side. In the micromirror array 40 according to the fourth embodiment, light incident on one surface side of the aforementioned array 40 is hence reflected once from the mirror surface on the front surface 40a side, and is reflected once from the mirror surface on the back surface 40b side. Then, the reflected light is transmitted through the array 40 to the other side thereof [FIG. 8B]. Thus, the micromirror array 40 according to the present fourth embodiment is capable of forming a mirror image of an object to be projected which is disposed on one surface side of the array 40 at a spatial position on the other surface side symmetrical to the object with respect to the plane of the array 40.

Also, in the aforementioned micromirror array 40, the light-reflective vertical surfaces (mirror surfaces) at the corner reflectors have a great aspect ratio [apparent virtual aspect ratio; H/W; FIG. 8B]. Therefore, these light-reflective vertical surfaces (mirror surfaces) are capable of projecting a bright and sharp mirror image, as compared with conventional products.

Further, the aforementioned micromirror array 40, in which the aforementioned grooves 2g and 2g' are formed in the front and back surfaces of the single substrate 2, is characterized in that the vertical distance between the mirror surfaces on the upper side (front surface 40a side) and the mirror surfaces on the lower side (back surface 40b side) is short, so that a relatively bright mirror image is easily obtained. Also, the micromirror array 40 is advantageous in that the array itself (total thickness) is made thin, as compared with the micromirror arrays of other embodiments.

Next, the manner of image formation of a mirror image in the aforementioned embodiments will be described.

FIG. 8A is a plan view of corner reflector portions inside the micromirror array according to the present invention as seen in a vertical direction, and FIG. 8B is a schematic view showing a three-dimensional structure of one corner reflector (a pair of mirror surfaces of one corner reflector) thereof. In FIG. 8B, the plate-like portions 1c and 1'c and the grooves 1g and 1'g of the substrates 1 and 1' are not shown, based on the configuration of the micromirror array 20 of the second embodiment (FIGS. 3 and 4) formed by bringing the front surfaces 1a and 1'a with the grooves 1g and 1'g formed therein into abutment with each other as a representative of the aforementioned embodiments. For ease of viewing of the configuration of principal parts (the vertically spaced mirror surfaces K1 and K2 of the corner reflector), FIG. 8B schematically shows only an intersection portion of an upper ridge area and a lower ridge area (a ridge area on the upper substrate 1' side and a ridge area on the lower substrate 1 side) included among the multiplicity of ridge areas (unmachined portions between the grooves in the front surfaces 1a and 1' a) and disposed so that the directions in which the grooves (ridges) extend are orthogonal to each other as seen in plan view (three-dimensionally in "skew" relation).

In the aforementioned other embodiments (first, third and fourth), there are cases where the plate-like portions 1c, 1'c and 2c and the like of a substrate are held between these ridge areas in the front surface 1'a on the upper side and the front surface 1a on the lower side, so that the vertical distance between the aforementioned mirror surfaces K1 and K2 is further increased. However, the corner reflectors in these embodiments may be regarded as those of the same configuration in principle, and are similar to the above as seen in plan view, as shown in FIG. 8A.

Like the prior art shown in FIG. 14, when light incident on one surface (front or back) side of the aforementioned micromirror array 20 passes through the array, the incident light (dash-double-dot lines) as seen in a vertical direction is reflected once from each of the two mirror surfaces (K1 and K2) on opposite sides of one corner (virtual corner portion) (twice in total), as shown in FIG. 8A. The light reflected twice (passing light) forms a mirror image (reversed image M') of an object M to be projected at a spatial position on the other surface side of the aforementioned array (position symmetrical to the object M with respect to the plane of the element surface).

When this is viewed three-dimensionally, one light reflecting surface [virtual region formed in an inner wall surface (mirror surface) of the ridge in the front surface 1a on the lower side; K1] and the other light reflecting surface [virtual region formed in an inner wall surface (mirror surface) of the ridge in the front surface 1'a on the upper side; K2] of each unit optical element are disposed in vertically spaced apart relation (in "skew" relation) in the micromirror array 20 according to the present invention, as shown in FIG. 8B. Thus, light (dash-double-dot lines) traveling through one surface (in the figure, the lower surface closer to the object M to be projected) of the aforementioned array into the ridge in the front surface 1a on the lower side is reflected once from the aforementioned lower mirror surface (region) K1, and is subsequently reflected a second time from the mirror surface (region) K2 in the ridge in the front surface 1'a on the upper side which the light has entered. Thereafter, the light travels out of the other surface (the upper surface closer to the reversed image M') of the aforementioned array in a direction symmetrical with respect to the plane of the element surface (abutment surface T of the aforementioned ridges in the front surfaces 1a and 1'a) [with reference to FIG. 8B and FIG. 14].

For the micromirror array employing the aforementioned manner of image formation of a mirror image, the brightness and sharpness of the mirror image (reversed image M') thereof is considered to be proportional to the amount of light passing (transmitted) through the aforementioned element surface (abutment surface T of the aforementioned ridges in the front surfaces 1a and 1'a). Specifically, the amount of light (passing light amount) passing through the element surface by being reflected twice in the aforementioned array is considered to depend on the size (effective area) and light reflectivity of the mirror surfaces (regions) K1 and K2 adjacent to the aforementioned element surface T. In particular, when light reflection from a reflecting surface (interface between a mirror surface and air space) is total reflection, the passing light amount is considered to be proportional to the areas of the mirror surfaces (regions) K1 and K2 (=apparent "virtual aspect ratio" of the aforementioned mirror surfaces).

According to a method of manufacturing a micromirror array according to the present invention to be described later, the aforementioned micromirror array is high in design flexibility to achieve the formation of a unit optical element of a desired shape [groove width G, spacing between grooves (groove intervals=width W of ridge portions), and groove depth (height H of ridge portions)] by means of the dicing blade J. Thus, the micromirror array and the optical elements constituting the micromirror array according to the present invention are capable of increasing the apparent effective area and virtual aspect ratio [the ratio of height H (length in the thickness direction of the substrate) to width W (width of ridge portions in the horizontal direction of the substrates) in the virtual region=H/W; with reference to FIG. 8B] of the light-reflective vertical surfaces (vertically spaced mirror surfaces K1 and K2) constituting the corner reflectors, as compared with conventional products. This achieves the projection of a bright, high-luminance and sharp mirror image.

The preferred shape of the grooves (for example, 1g, 1'g, 2g and 2g') obtained by engraving using the aforementioned dicing blade J includes a groove width G of approximately 20 to 350 μm and a groove depth H of approximately 50 to 500 μm, as mentioned earlier. The preferred shape of the thereby obtained remaining regions (ridge portions) where the aforementioned grooves are not formed includes a width W of approximately 50 to 300 μm in the horizontal direction of the substrate, and a height H of approximately 50 to 500 μm (the same as the depth of the grooves) in the thickness direction of the substrate. When the aforementioned array (substrate) is seen in plan view, it is desirable that the "ratio (W/G) of the width W of the ridge portions to the groove width G" is preferably not less than 1.0, and more preferably not less than 3.0 (the same applies to the optical element unit). In this case, the spacings between the grooves are represented by "G+H".

It is desirable that the ideal shape of the light reflecting surfaces (virtual regions K1 and K2 on the mirror surfaces) of the unit optical elements (corner reflectors) which is produced by stacking the aforementioned substrates (ridge portions) one on top of the other is such that the "virtual aspect ratio (H/W)" thereof is preferably not less than 1.0, and more preferably not less than 3.0 [with reference to FIG. 8B].

Next, a method of manufacturing a micromirror array and optical elements for use in the micromirror array according to the aforementioned embodiments will be described.

Figure 9:
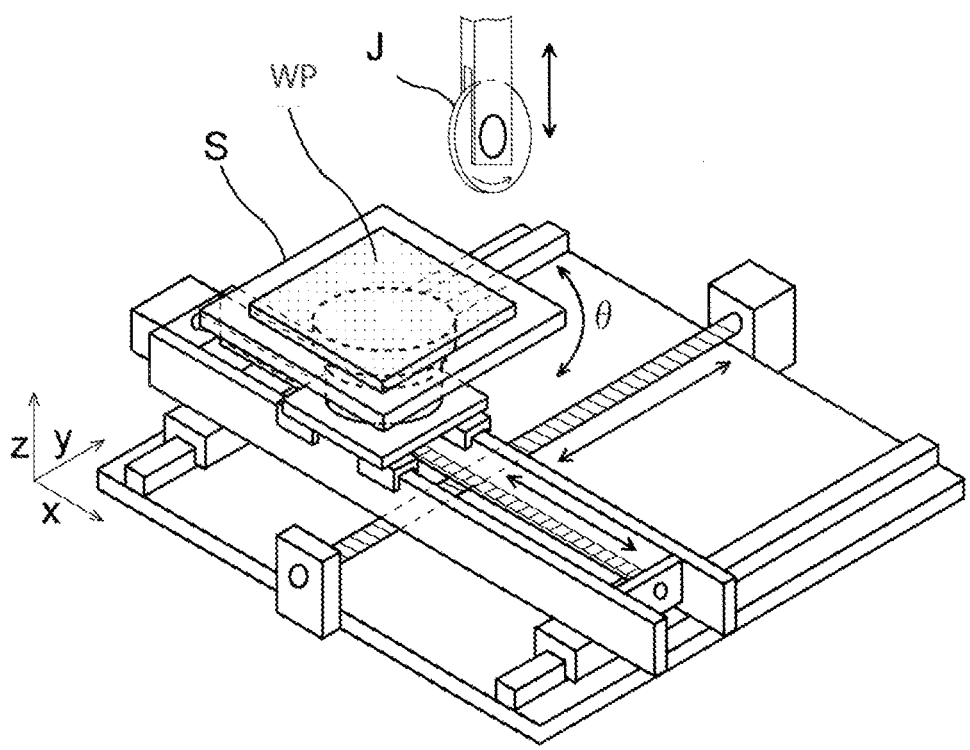
FIG. 9 is a schematic view of the configuration of a dicing machine for use in a method of manufacturing a micromirror array according to the embodiments of the present invention.

FIG. 9 is a schematic view of the configuration of a dicing machine for use in the manufacturing method for a micromirror array according to the embodiments of the present invention. In the figure, the reference character J designates a dicing blade (rotary blade), S designates a movable stage for machining, and WP designates a substrate (workpiece) to be machined.

The manufacture of the micromirror array 10 according to the aforementioned first embodiment is as follows. First, a transparent flat substrate 1 is prepared. This substrate is attached as a workpiece WP at a predetermined position of the machining stage (movable stage S) of the dicing machine (with reference to FIG. 9). The linear grooves 1g and 1'g parallel to each other are sequentially formed at predetermined intervals in a surface (one surface) of the aforementioned substrate by using the rotary blade (dicing blade J). Next, two substrates (optical elements) with the aforementioned linear grooves formed therein are used so that the front surface 1a of the first substrate 1 and the back surface of the second substrate 1' are joined together. The substrates 1 and are stacked together so that the continuous directions in which the linear grooves 1g and 1'g of the substrates 1 and 1' extend are orthogonal to each other as seen in plan view, to thereby constitute a single unit. This will be described step by step below.

The manufacture of the micromirror array 10 by the use of the aforementioned dicing machine (dicing saw) is as follows. First, a flat substrate made of a material having a visible light transmittance of not less than 80%, e.g. acrylic resin and the like, is prepared as a substrate (workpiece WP) to be machined into the array 10 [substrate preparing step].

Next, this substrate is affixed at a predetermined position on the aforementioned movable stage S with an adhesive tape, a gluing agent or the like, as shown in FIG. 9, with the surface to be machined facing upward (on the blade J side), and is attached and fixed (temporarily fixed) thereto as the workpiece WP. The workpiece WP may be grasped with a chuck, a vise and the like without using the gluing agent and the like [workpiece attaching step].

Next, the aforementioned movable stage S is moved to a machining start position. While being rotated at a high speed, the aforementioned blade J is moved downwardly to a position at which the aforementioned workpiece WP is engravable. In accordance with a previously programmed procedure, the aforementioned workpiece WP (movable stage S) is slid horizontally (in the x-axis direction), so that the surface to be machined (front surface) of the workpiece WP is engraved with a linear groove having a desired depth (50 to 500 μm).

After the engraving process for one linear groove is completed, the aforementioned movable stage S is moved to a machining start position for the next groove. Then, the aforementioned workpiece WP is slid horizontally (in the x-axis direction) at a predetermined feed speed again, so that the aforementioned next groove is formed by machining. The engraving of such a linear groove is repeated at predetermined intervals (spacings) in one direction (in the y-axis direction), the plurality of linear grooves 1g and 1'g arranged in a predetermined direction (y direction at this time) and parallel to each other are formed [groove forming step].

The aforementioned dicing machine will be described in further detail. The machine (with reference to FIG. 9) for use in this manufacturing method is referred to as a dicing machine, a dicing saw or the like. The dicing machine includes a rotary blade (diamond blade such as the dicing blade J) attached to the tip of a spindle (not shown) rotating at a high speed, a machining stage (movable stage S) for placing and temporarily fixing thereon a substrate (workpiece WP) formed into a microminor array after machining, a stage driving means for moving this movable stage S in three axis (x, y and z) directions corresponding to the rotation, and upward and downward movements of the aforementioned blade J and for rotating the movable stage S about the z axis (θ).

The aforementioned dicing blade J is a substantially ring-shaped ultrathin peripheral cutting edge, and has small-diameter abrasive grains of industrial diamond added to a cutting part provided on the outer peripheral surface (and also to left-hand and right-hand side end surfaces in some cases) thereof. The thickness (total thickness in the direction of end surfaces) of the blade J used herein is on the order of 0.015 mm (15 μm) to 0.3 mm (300 μm), and the width of the grooves 1g and 1'g obtained by engraving using this blade J is on the order of 0.02 mm to 0.35 mm. Although the blade J used herein has a flat outer peripheral surface (cutting edge surface), a blade having the aforementioned cutting edge surface of a triangular, circular and oval cross-sectional shape may be used.

As shown in FIG. 9, the movable stage S for temporarily fixing the aforementioned workpiece WP is provided on a slider (linear motion bearing) capable of freely moving (positioning) the position thereof in at least two, i.e. x and y, directions. In this example, the movable stage S is further capable of moving up and down in the z-axis direction (not shown) and rotating about the x axis (θ). The stage driving means in each axial direction (about each axis), which is similar in mechanism to a general-purpose machine tool, will not be described, but is capable of intermittent operation of the movable stage S, precise position control thereof, and programmed constant-speed travel thereof by means of a stepping motor, an actuator and the like. Some dicing machines are designed such that combinations of the spindles and the blade J are disposed in positions far from or close to each other so as to form a plurality of parallel grooves at a time by engraving.

With the position of the aforementioned movable stage S fixed, the positions of the spindle and the blade J may be moved and rotated horizontally to form a linear groove similar to that described above by engraving. The grain size of the abrasive grains of diamond used for the dicing blade J is generally on the order of #240 to #5000. In consideration of surface roughening of the light reflecting surfaces (opposite side walls of the grooves) after the dicing (although the mirror surfaces are desirable), it is preferable that the grain size of the abrasive grains is not less than #1000.

Next, after the completion of the engraving of the surface to be machined of the aforementioned workpiece with a previously determined number of grooves, the workpiece WP is removed from over the movable stage S, and a new workpiece WP is set thereon. The groove engraving is repeated to form the linear grooves of the same shape and of the same pattern are formed in a plurality of workpieces WP (substrates).

Next, two substrates (optical elements) with the aforementioned linear grooves formed therein are used. The front surface 1a of the first substrate 1 and the back surface 1'b of the second substrate 1' are joined together. The substrates 1 and 1' are stacked together so that the directions in which the linear grooves 1g and 1'g of the substrates 1 and 1' extend are orthogonal to each other as seen in plan view [the aforementioned manner of stacking (D)]. While being stacked together, these substrates 1 and 1' are fixed together with an adhesive agent, a double-sided adhesive tape and the like, to thereby constitute an integral (single) unit. This provides the micromirror array 10 of the first embodiment [substrate stacking step].

A method for fixing the aforementioned substrates 1 and 1' includes the use of a vise, a case (housing) or the like which inserts the aforementioned array 10 thereinto or surrounds the aforementioned array 10 to fix the substrates 1 and 1' in addition to the use of a member, an agent and the like, such as the aforementioned adhesive agent or the double-sided adhesive tape, which is put between the substrates to fix the substrates. If slight misregistration occurs at the stacking position (horizontal position) of the substrates 1 and 1' constituting the aforementioned micromirror array 10, the optical performance of the corner reflectors appearing at the intersection portions of the upper grooves 1g and the lower grooves 1'g is maintained. Thus, the fixing may be loose enough to prevent the misregistration at these positions.

The manufacturing method for a micromirror array according to the aforementioned first embodiment is capable of forming the aforementioned linear grooves 1g and 1'g with high accuracy and with high efficiency. Also, the aforementioned manufacturing method for a micromirror array does not include any step which damages the array as in a molding method and the like, to thereby improve the efficiency (yield) of the array manufacture. Therefore, the manufacturing method for a micromirror array according to the present invention is capable of manufacturing a micromirror array easily at low costs, as compared with conventional manufacturing methods.

Next, a method of manufacturing the micromirror array 20 according to the aforementioned second embodiment will be described. The manufacturing method for the micromirror array 20 according to the second embodiment differs from the manufacturing method for the micromirror array 10 according to the aforementioned first embodiment in the step of stacking the substrates 1 and 1' together (the manner of stacking). This step will be principally described.

The manufacture of the micromirror array 20 according to the aforementioned second embodiment is as follows. As in the manufacturing method of the aforementioned first embodiment, a transparent flat substrate (optical element) is initially prepared. This substrate is attached as a workpiece WP at a predetermined position of the machining stage (movable stage S) of the dicing machine (with reference to FIG. 9). The linear grooves 1g and 1'g parallel to each other are sequentially formed at predetermined intervals in one surface of the aforementioned substrate by using the rotary blade (dicing blade J).

Next, two substrates 1 and 1' with the aforementioned linear grooves formed therein are used. With the first upper substrate 1' flipped upside down and rotated 90 degrees horizontally relative to the second lower substrate 1, the front surface 1' a where the grooves 1'g are formed in the upper substrate 1' (the lower surface of the plate-like portion 1'c) is brought into abutment with the front surface 1a where the grooves 1g are formed in the lower substrate 1, as shown in FIG. 4. These substrates 1 and 1' are stacked together so that the directions in which the grooves 1g and the grooves 1'g provided in the substrates 1 and 1' extend are orthogonal to each other as seen in plan view [the aforementioned manner of stacking (E)]. While being stacked together, these substrates 1 and 1' are fixed together with an adhesive agent, a double-sided adhesive tape and the like, to thereby constitute an integral (single) unit. This provides the micromirror array 20 of the second embodiment.

A method for fixing the aforementioned substrates 1 and 1' includes the use of a vise, a case (housing) or the like which inserts the aforementioned array 20 thereinto or surrounds the aforementioned array 20 to fix the substrates 1 and 1' in addition to the use of a member, an agent and the like, such as the aforementioned adhesive agent or the double-sided adhesive tape, which is put between the substrates to fix the substrates, as in the aforementioned first embodiment. In the micromirror array 20 of the second embodiment in which the stacking is performed in the manner (B) and in the manner of stacking (E), the grooves 1g and 1'g of the substrates 1 and 1' face inward after the stacking. This is advantageous in that there is a low likelihood that foreign matter, such as grit and dust, which hinders light reflection comes into these grooves 1g and 1'g, so that light reflection performance decreases slightly with time.

For the manufacture of the micromirror array 30 of the aforementioned third embodiment, the array 30 is produced in a manner similar to that described above. However, when the substrates 1 and 1' are finally stacked together, the substrate 1' flipped upside down is disposed under the substrate 1. Then, with the substrate 1' rotated 90 degrees relative to the second upper substrate 1, the back surface 1b of the upper substrate 1 (the lower surface of the plate-like portion 1c) is brought into abutment with the back surface 1'b of the lower substrate 1' (the upper surface of the plate-like portion 1'c). The substrates 1 and 1' are stacked together so that the directions in which the grooves 1g and the grooves 1'g provided in the substrates 1 and 1' extend are orthogonal to each other as seen in plan view [the aforementioned manner of stacking (F)].

The manufacturing methods for a micromirror array according to the aforementioned second and third embodiments are capable of forming the aforementioned linear grooves 1g and 1'g with high accuracy and with high efficiency, as in the first embodiment. Also, the aforementioned manufacturing methods for a micromirror array do not include any step which damages the array as in a molding method and the like, to thereby improve the efficiency (yield) of the array manufacture.

Next, a method of manufacturing the micromirror array 40 according to the aforementioned fourth embodiment will be described. It should be noted that a dicing machine for use in the manufacturing method for the micromirror array 40 according to the fourth embodiment is similar in structure to the machine described above, and will not be described in detail.

The manufacture of the micromirror array 40 according to the aforementioned fourth embodiment is as follows. First, a transparent flat substrate 2 is prepared. This substrate is attached as a workpiece WP at a predetermined position of the machining stage (movable stage S) of the dicing machine (with reference to FIG. 9). The linear grooves 2g and 2g' parallel to each other are sequentially formed at predetermined intervals in one surface (surface to be machined) of the aforementioned substrate by using the rotary blade (dicing blade J).

Next, this substrate (workpiece WP) is removed once from the aforementioned machining stage S, and is flipped upside down. This substrate is attached again as a workpiece WP at a predetermined position of the machining stage S, with the back surface (surface to be machined) of the aforementioned substrate facing upward. The linear grooves 2g and 2g' parallel to each other and extending in a direction orthogonal to the linear grooves formed in the aforementioned front surface are sequentially formed at predetermined intervals in the back surface by using the aforementioned dicing blade J. This achieves the production of the micromirror array 40 in which the grooves 2g formed on the front surface 40a side and the grooves 2g' formed on the back surface 40b are orthogonal to each other in the form of a lattice as seen in plan view, when seen in the direction of the front and back of the substrate (vertical direction), as shown in FIG. 7.

The manufacturing method for a micromirror array according to the aforementioned fourth embodiment is also capable of forming the aforementioned linear grooves 2g and 2g' with high accuracy and with high efficiency, as in the first to third embodiments. Also, this method does not include any step which damages the array as in a molding method and the like, to thereby improve the efficiency (yield) of the array manufacture.

EXAMPLES

Next, examples in which the micromirror arrays of the aforementioned first to fourth embodiments are produced will be described. It should be noted that the present invention is not limited to the examples to be described below.

Example 1

First, an acrylic board serving as a substrate was prepared, and the micromirror array of the first embodiment was produced by dicing.
<Acrylic Board>
A substrate made of acrylic resin (flat board): 50 mm×50 mm×2 mm in thickness.
<Dicing Machine>
Automatic dicing saw DAD3350 manufactured by Disco Corporation.
<Dicing Conditions>
Dicing blade <NBC-Z2050 manufactured by Disco Corporation> with a blade thickness of 25 µm.
Spindle rpm: 30000 rpm.
Table feed speed: 3.0 mm/sec.
Cooling: shower cooler (water) 1 L/min, and shower nozzle (water) 0.5 L/min.
<Production of Optical Elements>
The aforementioned acrylic board was affixed to an adhesive tape <dicing tape: ELEP manufactured by Nitto Denko Corporation> and fixed thereto. In that state, the resultant structure obtained by fixing the aforementioned acrylic board was set on a chuck table (machining stage) of the dicing machine <manufactured by Disco Corporation>. Then, a predetermined number of grooves having a width of 30 µm and a depth of 300 µm were engraved (dug) at intervals (spacings) of 100 µm in a surface to be machined (upper surface) of the aforementioned acrylic board under conditions shown in <Dicing Conditions> described above so as to be parallel to each other. Thus, an optical element serving as a unit of manufacture was produced, as shown in FIGS. 2, 4 and 6. It should be noted that a plurality of optical elements are produced.

Two optical elements obtained as described above were used. With a first upper one of the optical elements (substrates) rotated 90 degrees horizontally relative to a second lower one of the optical elements (substrates) as shown in FIG. 2, the back surface (lower surface) of the upper optical element was brought into abutment with the front surface (upper surface) of the lower optical element. Then, the two optical elements were stacked together [aforementioned configurations (A) and (D)]. An adhesive agent <Acrysun-day adhesive agent manufactured by Acrysunday Co., Ltd.> in small amounts was used for bonding and fixing at four corners of the array. Thus, the micromirror array of Example 1 was produced (with reference to FIG. 1).

Example 2

Two optical elements obtained as described above were used. With a first upper one of the optical elements (substrates) flipped upside down and rotated 90 degrees horizontally relative to a second lower one of the optical elements (substrates) as shown in FIG. 4, the front surface (lower surface) of the upper optical element was brought into abutment with the front surface (upper surface) of the lower optical element. Then, the two optical elements were stacked together [aforementioned configurations (B) and (E)]. An adhesive agent <Acrysunday adhesive agent manufactured by Acrysunday Co., Ltd.> in small amounts was used for bonding and fixing at four corners of the array. Thus, the micromirror array of Example 2 was produced (with reference to FIG. 3).

Example 3

Two optical elements obtained as described above were used. With a first lower one of the optical elements (substrates) flipped upside down and rotated 90 degrees horizontally relative to a second upper one of the optical elements (substrates) as shown in FIG. 6, the back surface (lower surface) of the upper optical element was brought into abutment with the back surface (upper surface) of the lower optical element. Then, the two optical elements were stacked together [aforementioned configurations (C) and (F)]. An adhesive agent <Acrysunday adhesive agent manufactured by Acrysunday Co., Ltd.> in small amounts was used for bonding and fixing at four corners of the array. Thus, the micromirror array of Example 3 was produced (with reference to FIG. 5).

Example 4

First, an acrylic board serving as a substrate was prepared, and an optical element similar to those used in Examples 1 to 3 [an acrylic board in which a plurality of parallel grooves are formed by engraving in one surface (front surface) thereof] was produced by dicing. Next, this acrylic board was removed once from the machining stage. After being flipped upside down and rotated 90 degrees, the acrylic board was attached again onto this machining stage with the aforementioned adhesive tape, with the back surface (a second surface to be machined) of the aforementioned acrylic board facing upward. Then, a predetermined number of linear grooves similar in shape to the grooves (having a width of 30 µm and a depth of 300 µm at intervals of 100 µm) formed on the aforementioned front surface side were engraved (dug) in the second surface to be machined (upper surface) of the aforementioned acrylic board under conditions shown in <Dicing Conditions> described above so as to extend in a direction orthogonal to the linear grooves formed on the front surface side. Thus, the micromirror array of Example 4 was produced as shown in FIG. 7.

Figure 10:
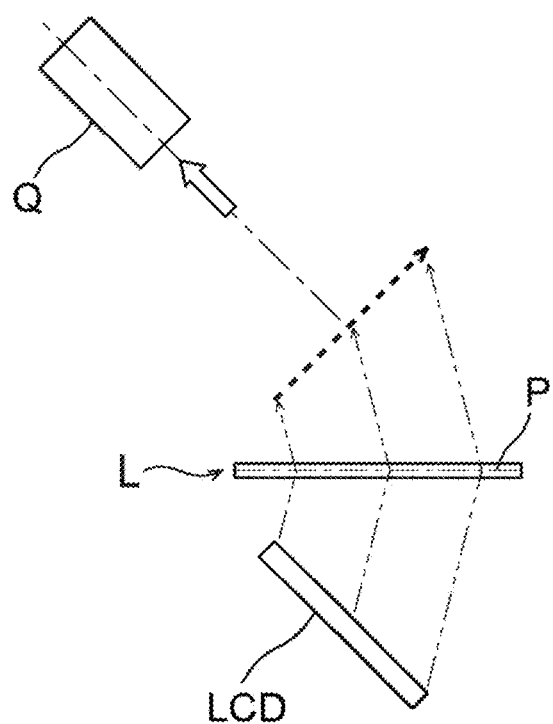
FIG. 10 is a schematic view illustrating a method for an experiment in projecting a mirror image according to the embodiments of the present invention.

The micromirror array L obtained in each of Examples 1 to 4 was set horizontally. A liquid crystal display panel (LCD) was disposed at an inclined angle of 45 degrees at a position lying under the micromirror array L, as shown in FIG. 10. Then, an evaluation image (a white square measuring 1 cm×1 cm) of a predetermined luminance was displayed on the aforementioned LCD. As a result, a mirror image (indicated by a dotted line in the figure) of the aforementioned evaluation image was image-formed at a spatial position symmetrical to the evaluation image with respect to the plane of an element surface P when any one of the micromirror arrays L of Examples 1 to 4 was used. From this fact, it is found that each of the micromirror arrays of the aforementioned examples functions as an image-forming optical element.

Next, the groove depth and the height H of ridge portions of each optical element (substrate) constituting the micromirror arrays of the present invention were changed, so that micromirror arrays (Examples 5 to 10) were produced which were different in "the ratio of height H (length in the thickness direction of the substrates) to width W (width of ridge portions in the horizontal direction of the substrates)" [aspect ratio (H/W)] of light reflecting surfaces [virtual regions K1 and K2; with reference to FIG. 8B] of the micromirror arrays and in effective light reflection area. Using these micromirror arrays, comparisons of the "brightness (luminance)" of mirror images (spatial images) and the "sharpness (visual recognizability)" of the images were made in the case where a predetermined image displayed on a liquid crystal display (LCD) was projected by a method similar to that (FIG. 10) of "Example 1" described above.

It should be noted that <Dicing Conditions> used herein for the acrylic board were similar to processing condition of "Example 1" described above. The dimensions of the produced micromirror arrays were observed and measured with a microscope <VHX-200 manufactured by Keyence Corporation> and a laser microscope <VK-9700 manufactured by Keyence Corporation>. Because the same dicing blade is used in Examples 5 to 10 described above, all of the examples have the same groove width G (30 μm), the same width W (70 μm) of ridge portions, and the same spacings between grooves (G+H) except for the aforementioned groove depth (height H of ridge portions).

The aforementioned micromirror array includes two optical elements identical in specs with each other, as shown in FIG. 4. The front surface 1'a where the grooves 1'g are formed in the first substrate 1' is brought into abutment with the front surface 1a where the grooves 1g are formed in the second substrate 1. These substrates 1 and 1' are stacked one on top of the other so that the directions in which the grooves 1g and the grooves 1'g provided in the substrates 1 and 1' extend are orthogonal to each other as seen in plan view, to constitute the single micromirror array as shown in FIG. 3 [aforementioned configurations (B) and (E)].

[Brightness Measurement of Mirror Image (Spatial Image)]

The micromirror array L obtained in each of Examples 5 to 10 was set horizontally, as shown in FIG. 10, and the LCD was disposed at an inclined angle of 45 degrees at a predetermined position lying under the micromirror array L. Then, an evaluation image (a white square measuring 1 cm×1 cm) of a predetermined luminance was displayed on the aforementioned LCD. The brightness (luminance) of a mirror image (indicated by a dotted line in the figure) projected at a spatial position symmetrical to the evaluation image with respect to the plane of the element surface P was measured from above at a distance of 50 cm from the mirror image at a downward angle of 45 degrees in opposed relation to the mirror image. The measurement of the brightness of the aforementioned mirror image was made in a darkroom. A luminance meter Q <BM-9 manufactured by Topcon Corporation> was used for the measurement of the brightness of the mirror image.

[Evaluation of Visual Recognizability of Mirror Image (Character)]

Following the aforementioned "Brightness Measurement of Mirror Image", an evaluation image (black Kanji characters for "Nitto Denko" in Ming-style type (Mincho typeface) each measuring 2 cm×2 cm on a white background) of a predetermined luminance was displayed on the aforementioned LCD by using a similar arrangement (with reference to FIG. 10). A mirror image (indicated by the dotted line in the figure) projected at the spatial position symmetrical to the evaluation image with respect to the plane of the element surface P was visually observed from above at a distance of 50 cm from the mirror image at a downward angle of 45 degrees in opposed relation to the mirror image. The evaluation of the visual recognizability of the aforementioned mirror image was performed under a fluorescent light (300 lux or more) in a room. The evaluation was as follows: a mirror image in which even the details of the characters were clearly visually recognizable was indicated by "S"; a mirror image which was visually recognizable as characters but not clear was indicated by "A"; and a mirror image which was not visually recognizable as characters was indicated by "F".

The results of the aforementioned measurement are shown in "Table 1" below.

TABLE 1

|  | Ex. 5 | Ex. 6 | Ex. 7 | Ex. 8 | Ex. 9 | Ex. 10 |
|---|---|---|---|---|---|---|
| Width G of Grooves between Ridges (μm) | 30 | 30 | 30 | 30 | 30 | 30 |
| Width W of Light Reflecting Surfaces (Unit Optical Elements) (μm) | 70 | 70 | 70 | 70 | 70 | 70 |
| Height H of Light Reflecting Surfaces (Unit Optical Elements) (μm) | 70 | 146 | 217 | 286 | 354 | 430 |
| Aspect Ratio (H/W) | 1.00 | 2.09 | 3.10 | 4.09 | 5.06 | 6.14 |
| Brightness (Luminance) (cd/m$^2$) | 0.11 | 0.24 | 0.44 | 0.65 | 0.77 | 0.59 |
| Visual Recognizability (Character Image) | A | A | S | S | S | S |

The aforementioned results of "brightness (luminance)" in "Table 1" showed that the higher the virtual aspect ratio (H/W) of the light reflecting surfaces (Example 5→Example 9), the more improved the brightness (luminance) of the aforementioned mirror image. In Examples 5 and 6 in which the aforementioned luminance was less than 0.4 cd/m$^2$, the characters in the image were difficult to recognize. In Examples 7 and 10 in which the aforementioned luminance was not less than 0.4 cd/m$^2$, the characters were in a clearly legible condition.

Figure 11:
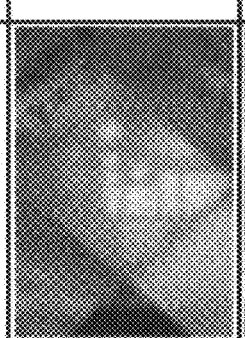
FIG. 11 shows reference photographs taken with a camera and showing how a spatial image (character) looks like according to the embodiments of the present invention.
Figure 11:
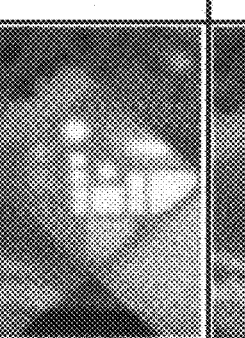
Figure 11:
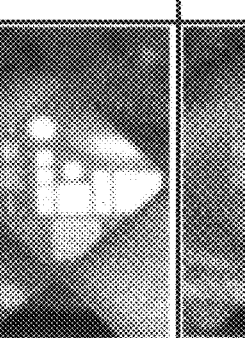
Figure 11:
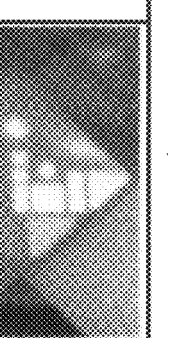
Figure 12:
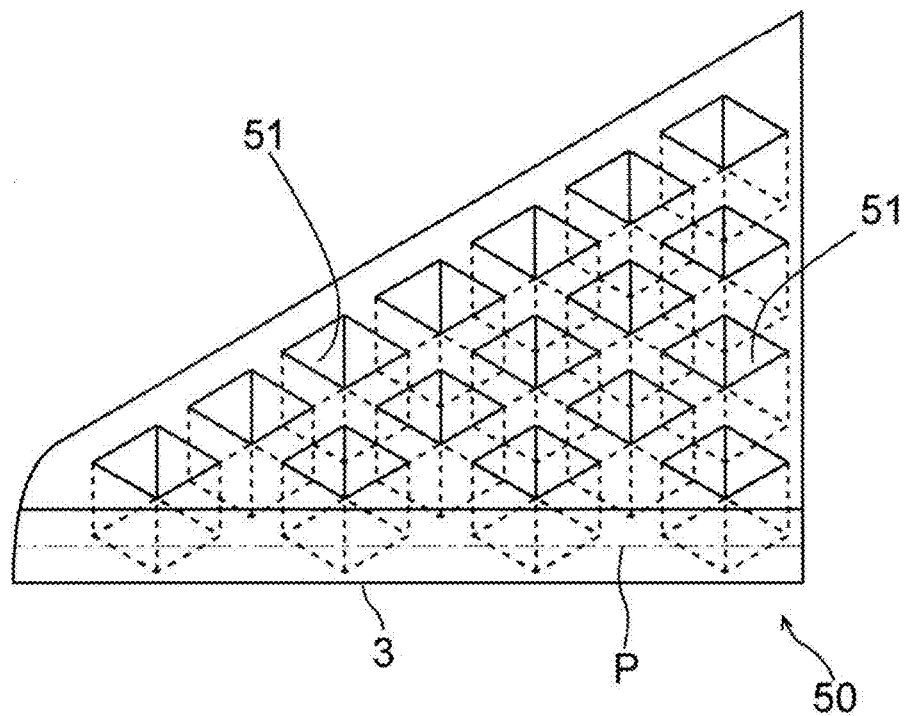
FIG. 12 is a schematic view showing a structure of a conventional recessed type micromirror array on an enlarged scale.
Figure 13:
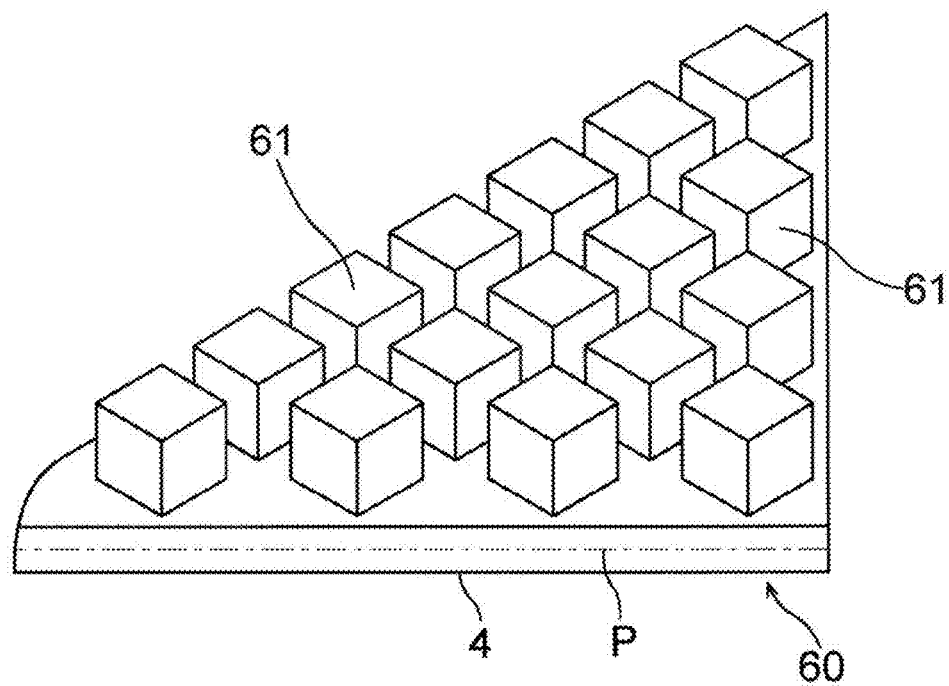
FIG. 13 is a schematic view showing a structure of a conventional protruding type micromirror array on an enlarged scale.

Examples of how the actual characters (mirror image) look like in Examples 7 to 10 which show successful results of the aforementioned "Visual Recognizability of Mirror Image (Character)" are shown as reference photographs in FIG. 11. The visual recognizability of character images is dependent on the ambient environment (brightness) and resolution, and hence cannot be defined unconditionally. It was, however, found from the aforementioned results of the reference photographs that the luminance (absolute value) of the mirror image (projected image) was preferably not less than 0.4 cd/m², and further desirably not less than 0.5 cd/m².

In the aforementioned examples, the test was conducted using the micromirror array configured by bringing the front surfaces (1a and 1'a) where the grooves 1'g were formed in the two optical elements identical in specs with each other into abutment with each other [with reference to FIG. 3; aforementioned configuration (B)]. However, substantially similar results were obtained when the test was conducted using the micromirror array configured by bringing the back surfaces (1b and 1'b) where the grooves 1'g were not formed into abutment with each other [with reference to FIG. 5; aforementioned configuration (C)].

Although specific forms in the present invention have been described in the aforementioned examples, the aforementioned examples should be considered as merely illustrative and not restrictive. It is contemplated that various modifications evident to those skilled in the art could be made without departing from the scope of the present invention.

The micromirror array, the manufacturing method for the micromirror array, and optical elements for use in the micromirror array according to the present invention are capable of manufacturing a micromirror array which forms a bright high-luminance image with high efficiency. The manufacturing method for the micromirror array according to the present invention contributes to the reduction in costs thereof.

REFERENCE SIGNS LIST 1, 1' Substrates
1a. 1'a Front surfaces
1b, 1'b Back surfaces
1c, 1'c Plate-like portions
1g, 1'g Grooves
2 Substrate
2a Front surface
2b Back surface
2g, 2g' Grooves
3, 4 Substrates
10, 20, 30, 40 Micromirror arrays
10a, 20a, 30a, 40a Front surfaces
10b, 20b, 30b, 40b Back surfaces
50 Micromirror array
51 Minute holes
60 Micromirror array
61 Minute protruding portions
K Corners
K1, K2 Mirror surfaces
L Micromirror array
M Object to be projected
M' Reversed image
P Element surface
Q Luminance meter
J Blade
S Movable stage
WP Workpiece

What is claimed is:

1. A micromirror array comprising:
two optical elements each having a plurality of parallel linear grooves arranged at predetermined spacings and formed in a first surface of a transparent flat substrate, the two optical elements being stacked together so that the directions in which the linear grooves of the respective optical elements extend are orthogonal to each other as seen in plan view, to thereby constitute a single unit,
wherein the two optical elements are stacked together in a manner selected from the group consisting of:
(A) a manner in which the front surface of one of the optical elements where the linear grooves are formed and the back surface of the other optical element where the grooves are not formed are brought into abutment with each other;
(B) a manner in which the front surfaces of the respective optical elements where the linear grooves are formed are brought into abutment with each other; and
(C) a manner in which the back surfaces of the respective optical elements where the grooves are not formed are brought into abutment with each other,
wherein the micromirror array is capable of forming a mirror image of an object to be projected which is disposed on a first surface side of the micromirror array at a spatial position on a second surface side thereof symmetrical to the object with respect to the plane of an element surface of the micromirror array.

2. A micromirror array comprising:
a plurality of parallel linear grooves arranged at predetermined spacings and formed in a first surface of a transparent flat substrate constituting an optical element and in a second surface thereof opposite from the first surface,
wherein the directions in which the linear grooves on the front surface side and the linear grooves on the back surface side extend are orthogonal to each other as seen in plan view,
wherein the micromirror array is capable of forming a mirror image of an object to be projected which is disposed on a first surface side of the micromirror array at a spatial position on a second surface side thereof symmetrical to the object with respect to the plane of an element surface of the micromirror array.

3. A method of manufacturing a micromirror array, comprising:
preparing a transparent flat substrate;
attaching the substrate at a predetermined position of a machining stage of a dicing machine;
sequentially forming a plurality of parallel linear grooves arranged at predetermined intervals in a surface of said substrate by using a rotary blade; and
stacking two substrates where said linear grooves are formed together so that the directions in which the linear grooves of the respective substrates extend are orthogonal to each other as seen in plan view, to thereby constitute a single unit,
wherein the two substrates are stacked together in a manner selected from the group consisting of:
(D) a manner in which the front surface of one of the substrates where the linear grooves are formed and the back surface of the other substrate where the grooves are not formed are joined together for the stacking of the substrates;
(E) a manner in which the front surfaces of the respective substrates where the linear grooves are formed are joined together for the stacking of the substrates; and
(F) a manner in which the back surfaces of the respective substrates where the grooves are not formed are joined together for the stacking of the substrates.

4. A method of manufacturing a micromirror array, comprising:
  preparing a transparent flat substrate;
  attaching the substrate at a predetermined position of a machining stage of a dicing machine;
  sequentially forming a plurality of parallel linear grooves arranged at predetermined intervals in a first surface of said substrate by using a rotary blade;
  removing the substrate once from said machining stage to flip the substrate upside down and to thereafter attaching the substrate again at a predetermined position of the machining stage; and
  sequentially forming a plurality of parallel linear grooves similar to those in said first surface and arranged at predetermined intervals in a second surface of said substrate by using a rotary blade, so as to extend in a direction orthogonal to the linear grooves in said first surface as seen in plan view.

5. A micromirror array comprising:
  two optical elements stacked one on top of the other,
  wherein the optical elements comprise a transparent flat substrate comprising a plurality of parallel linear grooves arranged at predetermined spacings formed in a surface thereof,
  wherein a "height-to-width" ratio of a width of substrate front surface portions lying between adjacent linear grooves to a height of the substrate front surface portions from the bottom of the grooves is not less than 3.0, and
  wherein the micromirror array is capable of forming a mirror image of an object to be projected which is disposed on a first surface side of the micromirror array at a spatial position on a second surface side thereof symmetrical to the object with respect to the plane of an element surface of the micromirror array.

* * * * *